W. A. BURNOP, DEC'D.
E. A. BURNOP, ADMINISTRATRIX.
COMPUTING AND REGISTERING MECHANISM.
APPLICATION FILED SEPT. 8, 1909.
1,004,682.
Patented Oct. 3, 1911.
18 SHEETS—SHEET 2.
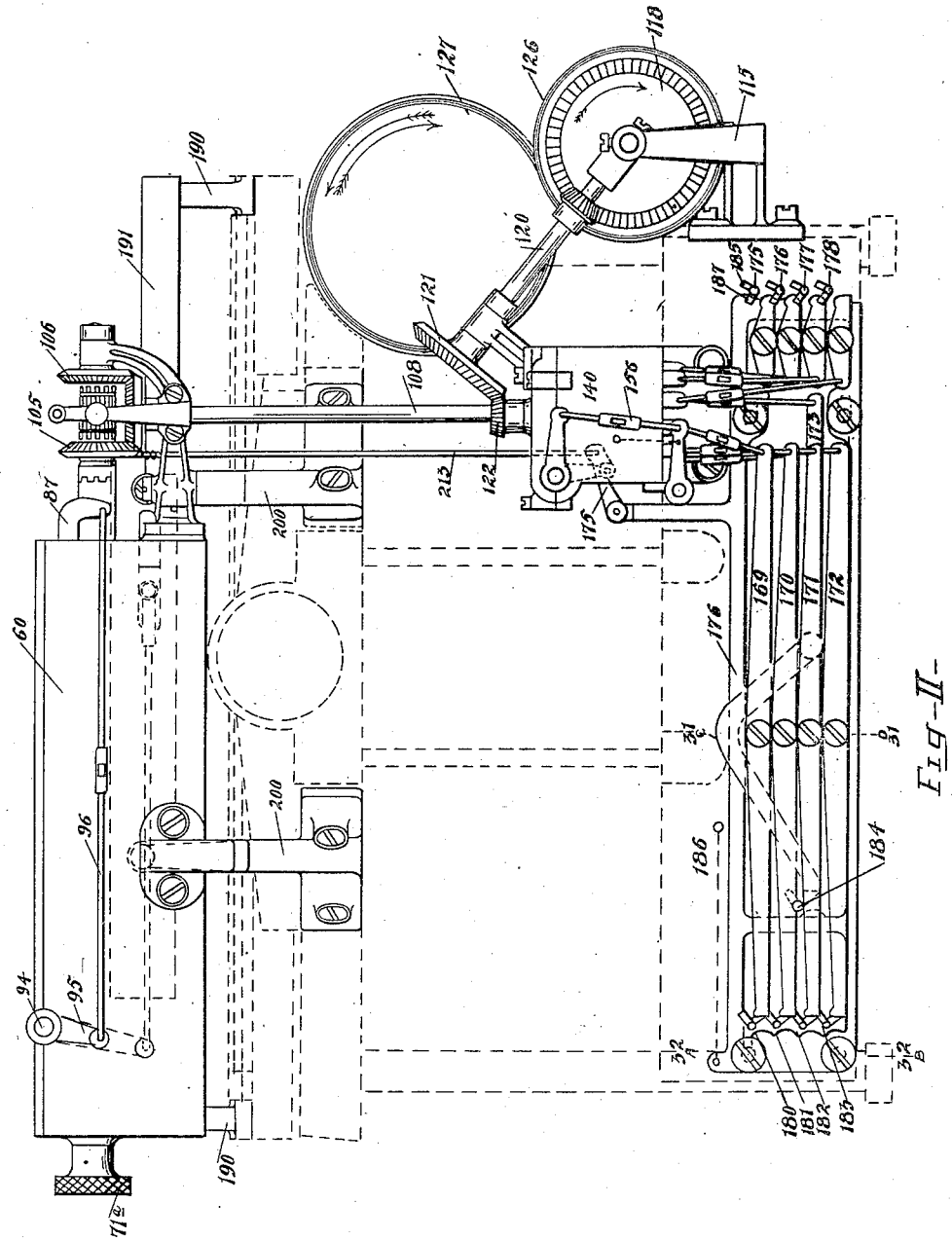
Witnesses
L. C. Snyder
L. M. Sweeney
Inventor
WILLIAM A. BURNOP, DECEASED.
ESTHER A. BURNOP, ADMX.
By
Robinson Martin & Jones
Attorneys.

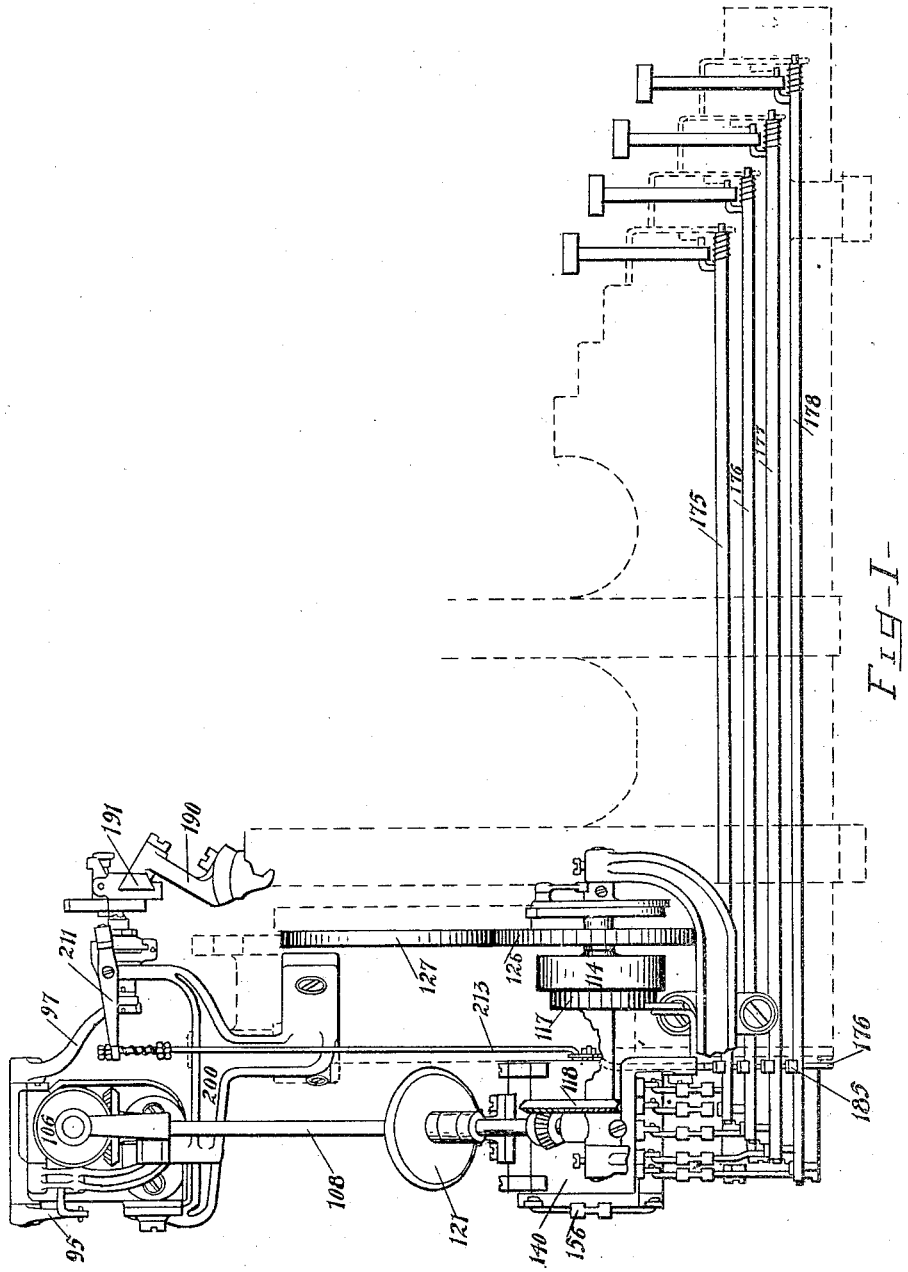

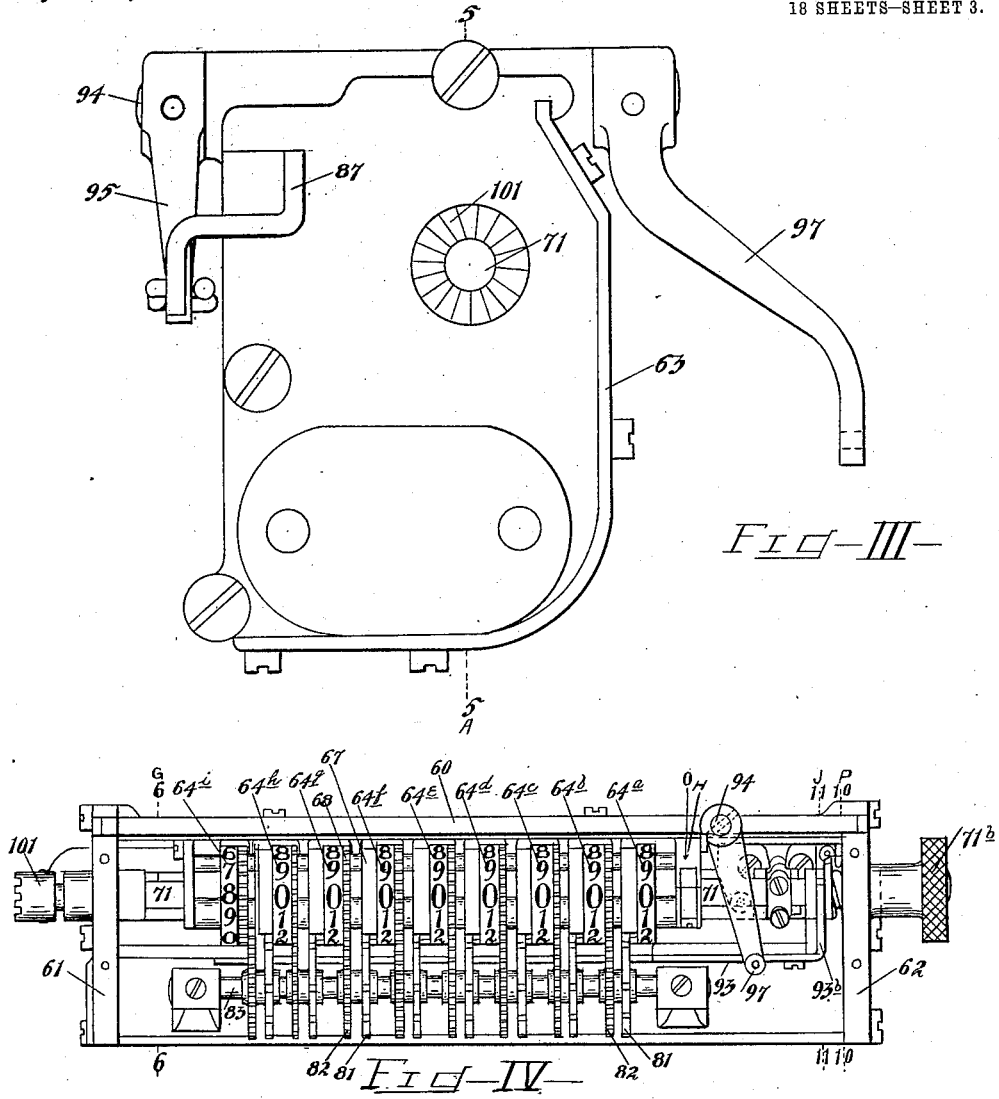

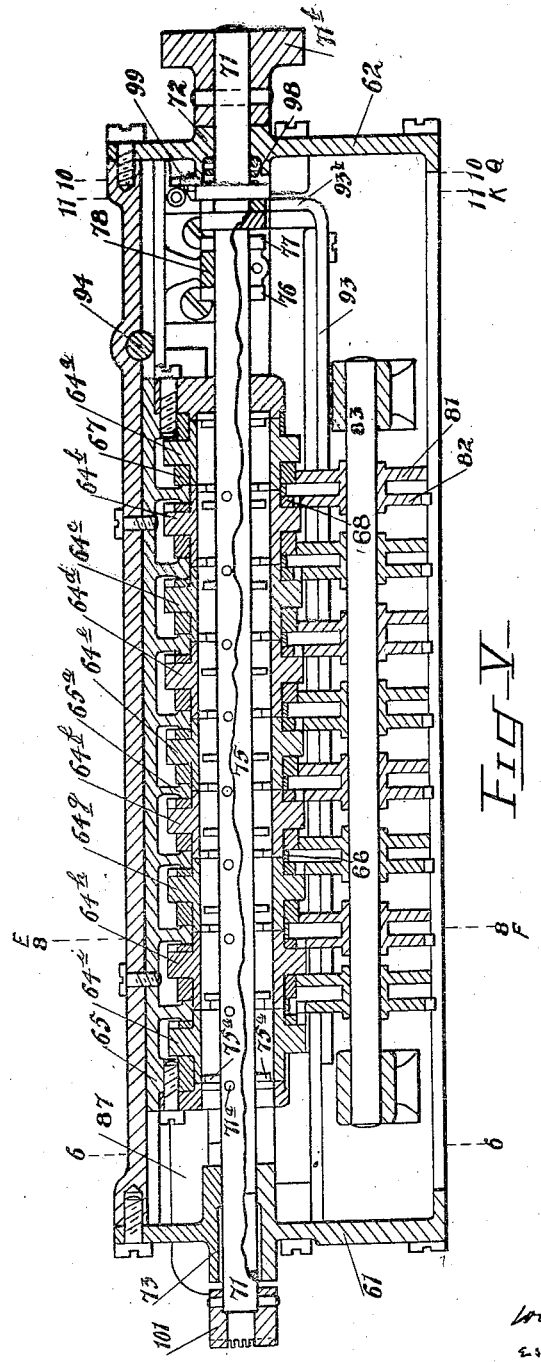

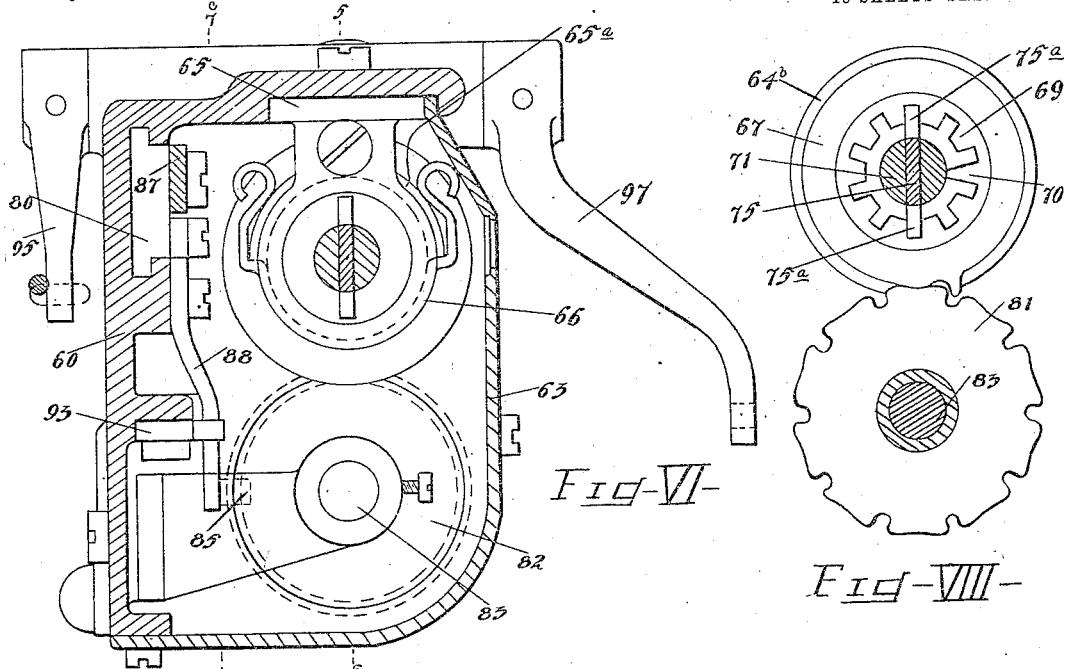
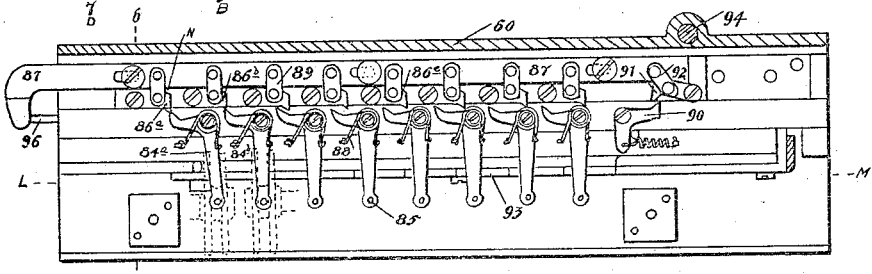
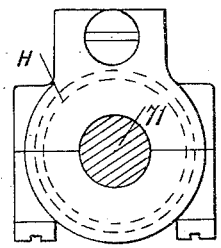
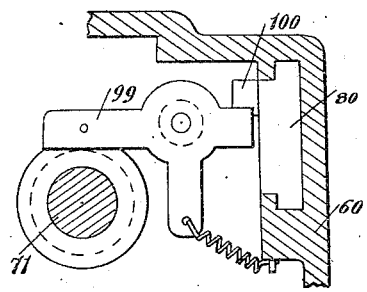
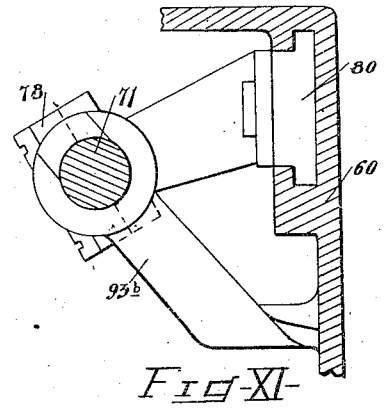

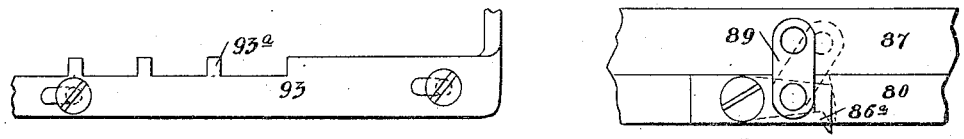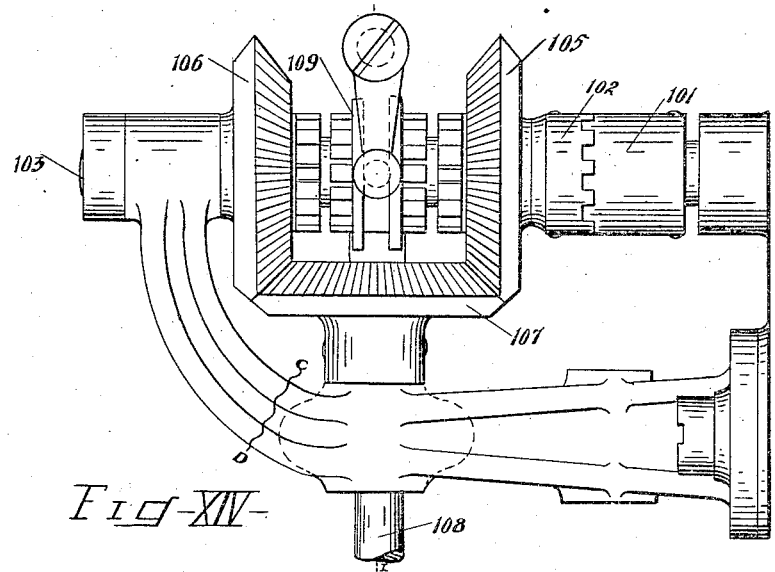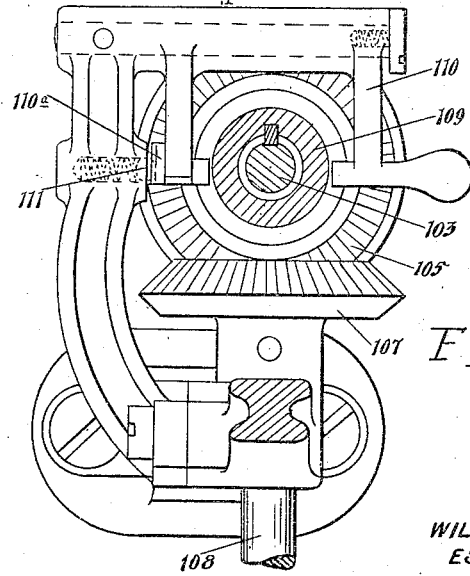

W. A. BURNOP, DEC'D.
E. A. BURNOP, ADMINISTRATRIX.
COMPUTING AND REGISTERING MECHANISM.
APPLICATION FILED SEPT. 8, 1909.
1,004,682.
Patented Oct. 3, 1911.
18 SHEETS—SHEET 7.
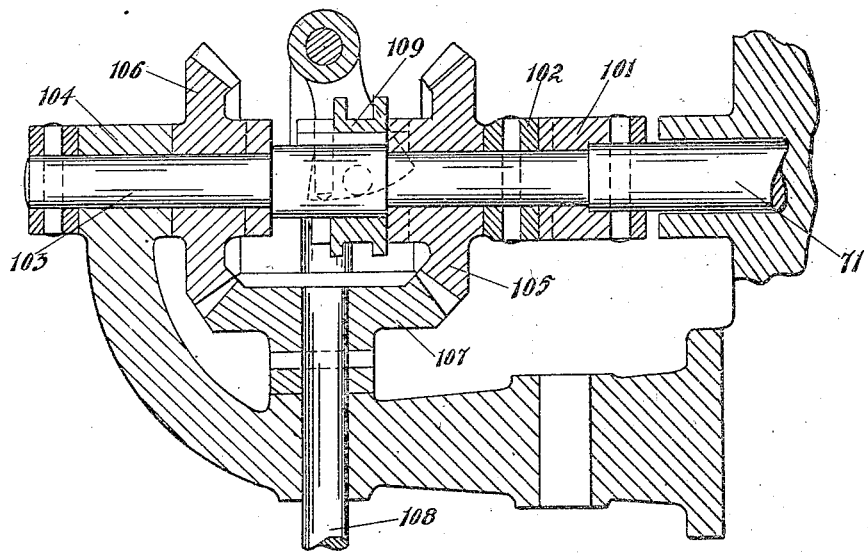
Fig-XVI-
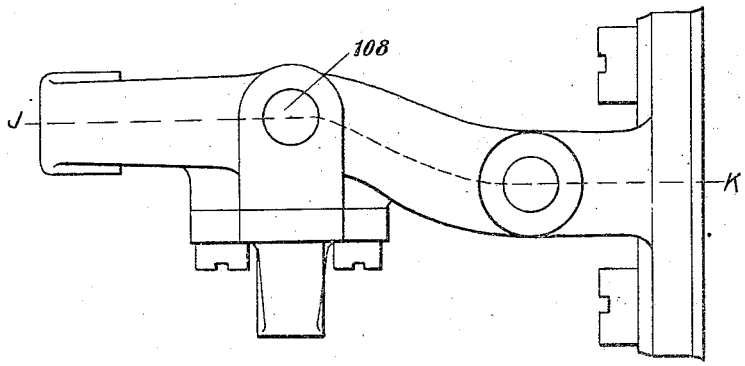
Fig-XVII-
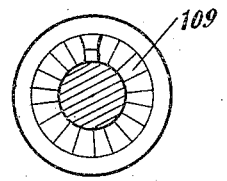
Fig-XVIII
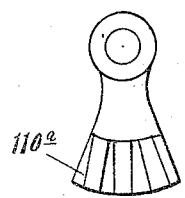
Fig-XIX-
Witnesses
L. C. Snyder
C. M. Sweeney
Inventor
WILLIAM A. BURNOP, DECEASED
ESTHER A. BURNOP, ADMX.
BY
Attorneys

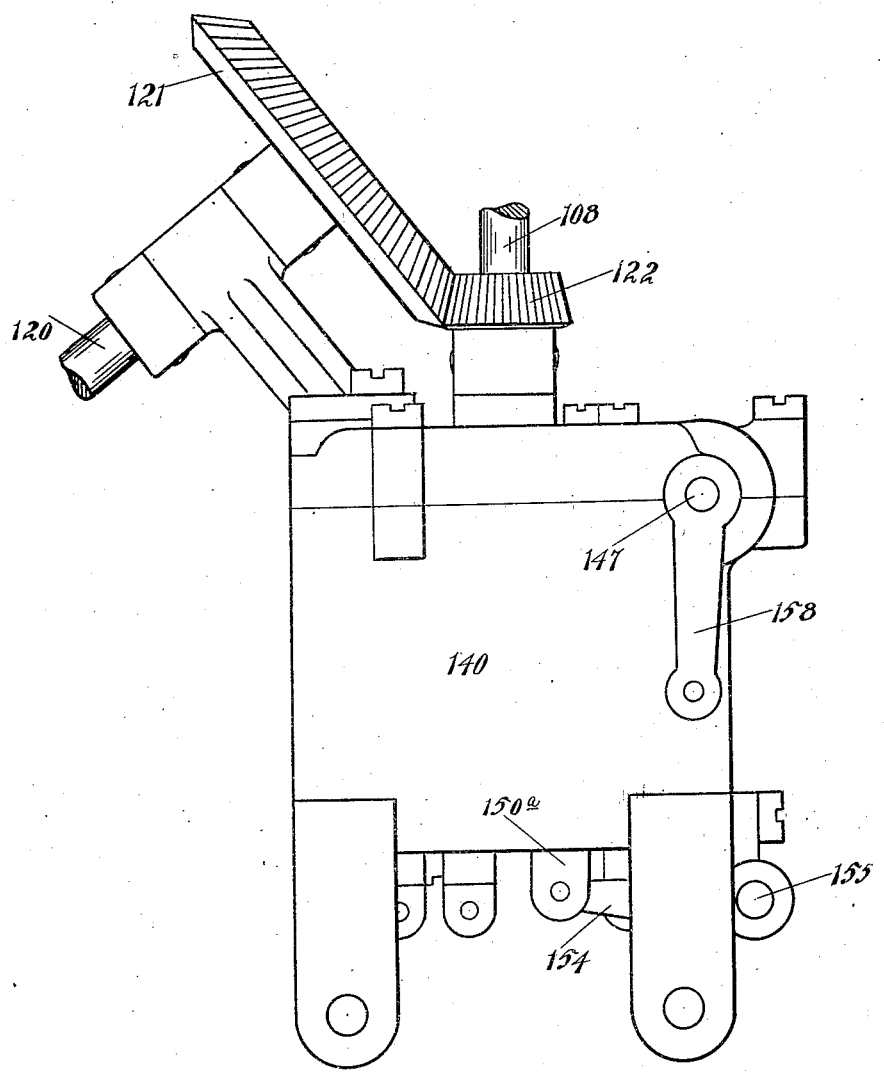

W. A. BURNOP, DEC'D.
E. A. BURNOP, ADMINISTRATRIX.
COMPUTING AND REGISTERING MECHANISM.
APPLICATION FILED SEPT. 8, 1909.
1,004,682.
Patented Oct. 3, 1911.
18 SHEETS—SHEET 9.
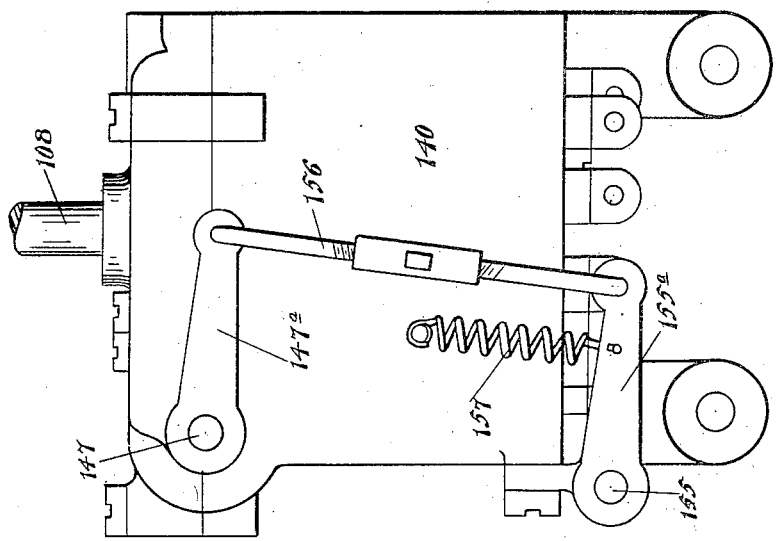
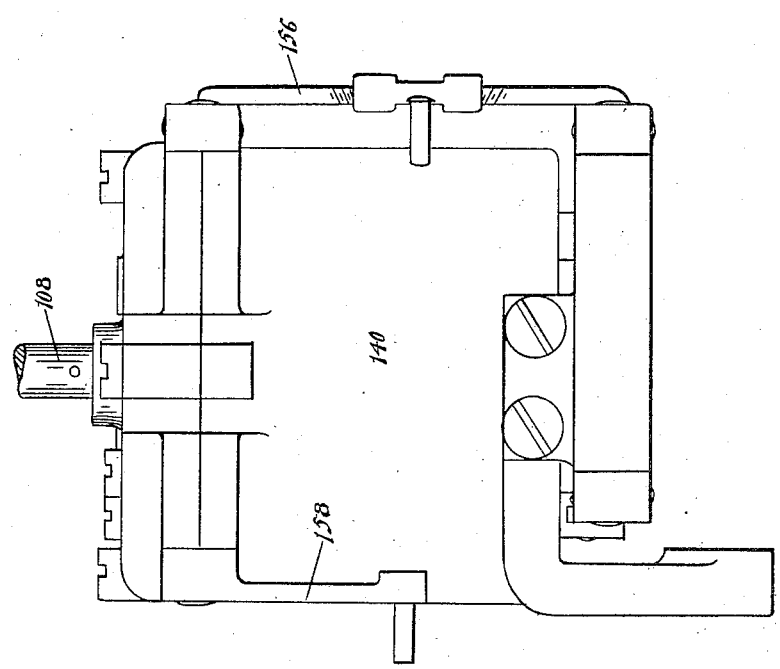
Witnesses
L. C. Snyder
C. M. Sweeney
Inventor
WILLIAM A. BURNOP, DECEASED.
ESTHER A. BURNOP, ADMX.
BY
Robinson Martin & Jones
Attorneys.

W. A. BURNOP, DEC'D.
E. A. BURNOP, ADMINISTRATRIX.
COMPUTING AND REGISTERING MECHANISM.
APPLICATION FILED SEPT. 8, 1909.
1,004,682.
Patented Oct. 3, 1911.
18 SHEETS—SHEET 10.
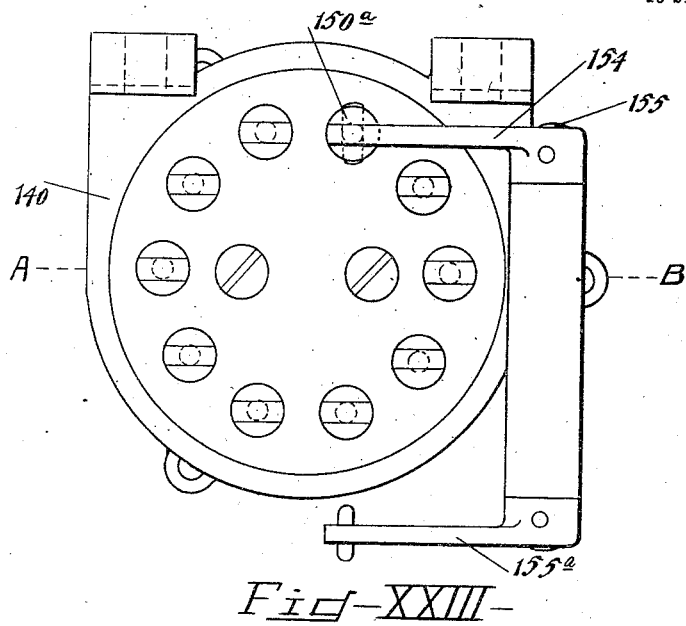
Fig-XXIII-
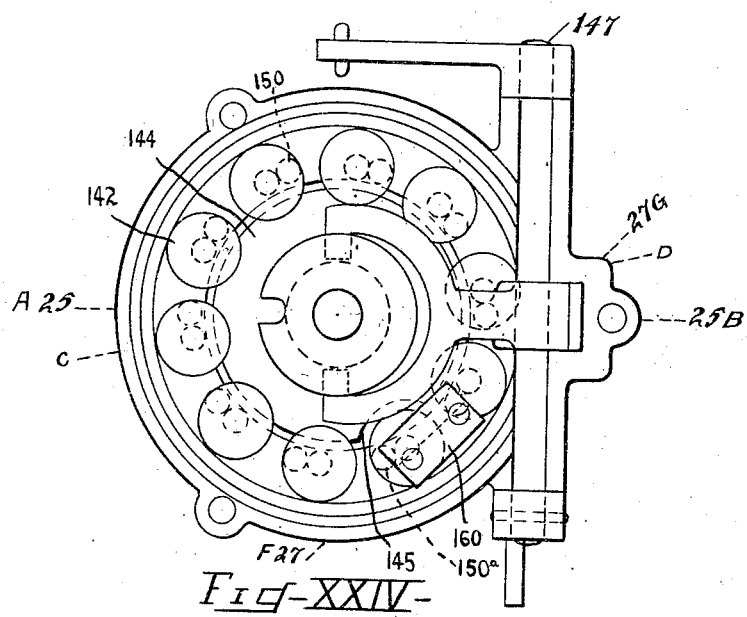
Fig-XXIV-
Witnesses
L. C. Snyder
C. M. Sweeney
Inventor
WILLIAM A. BURNOP, DECEASED.
ESTHER A. BURNOP, ADMX.
By
Robinson Martin & Jones
Attorneys.

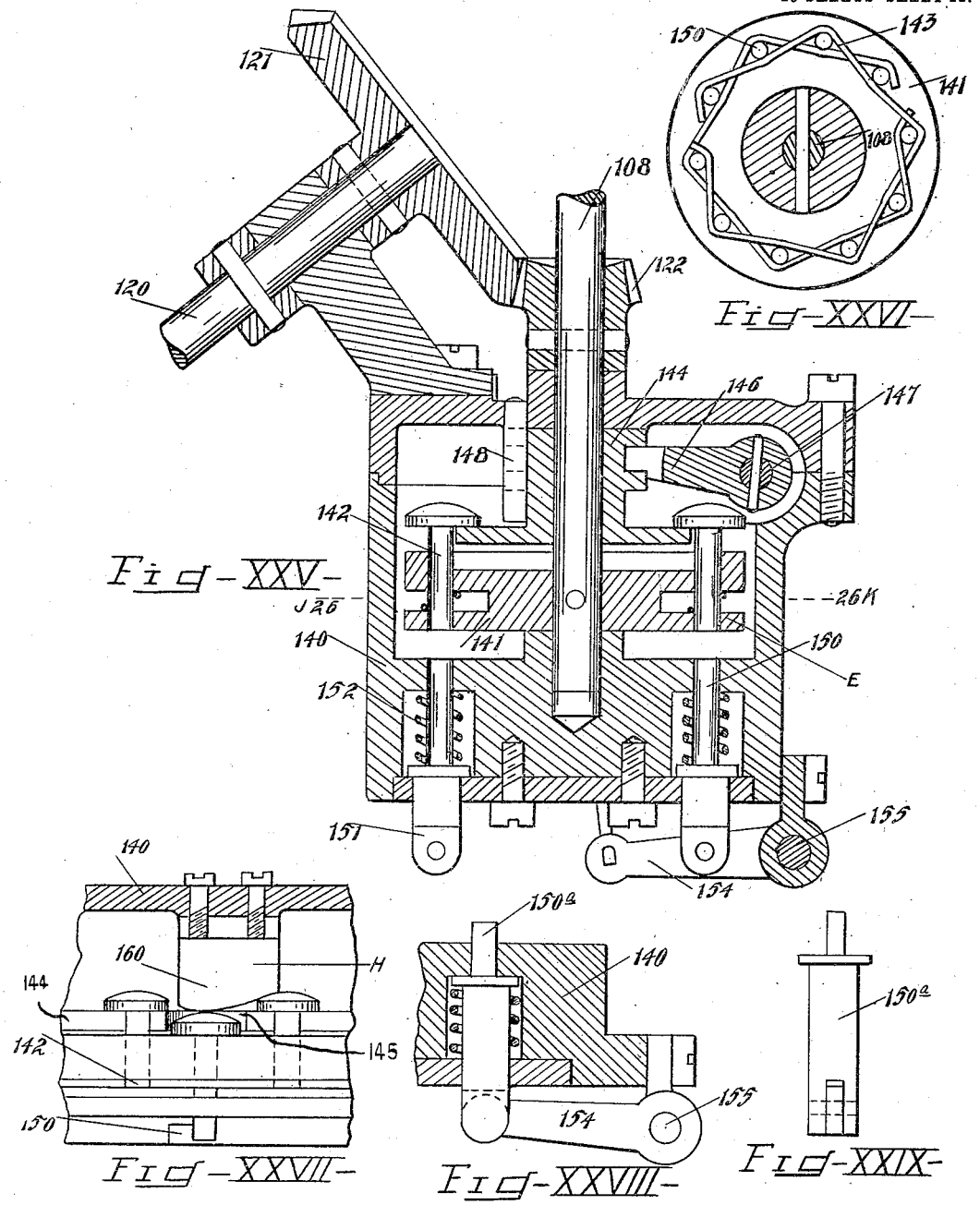

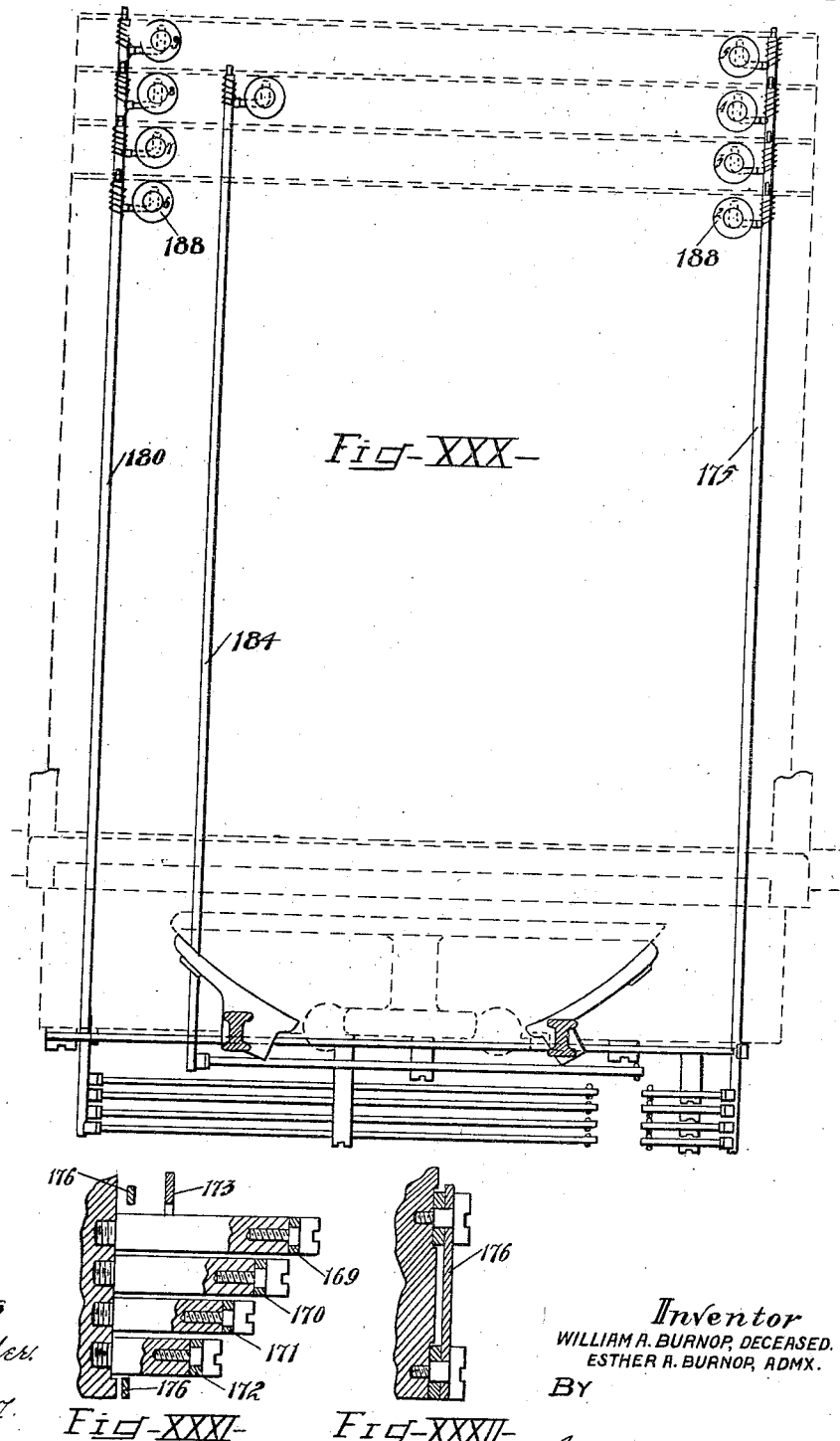

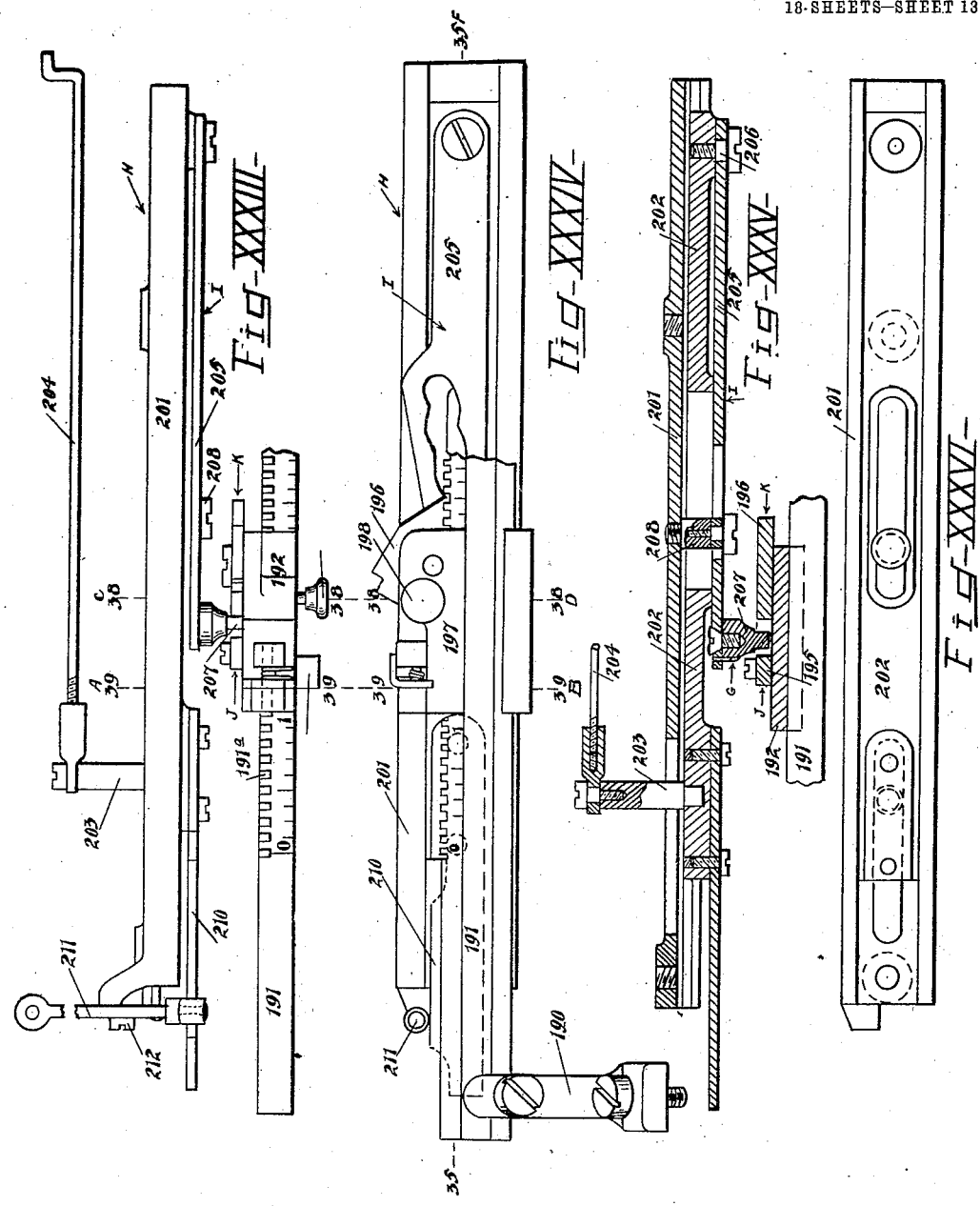

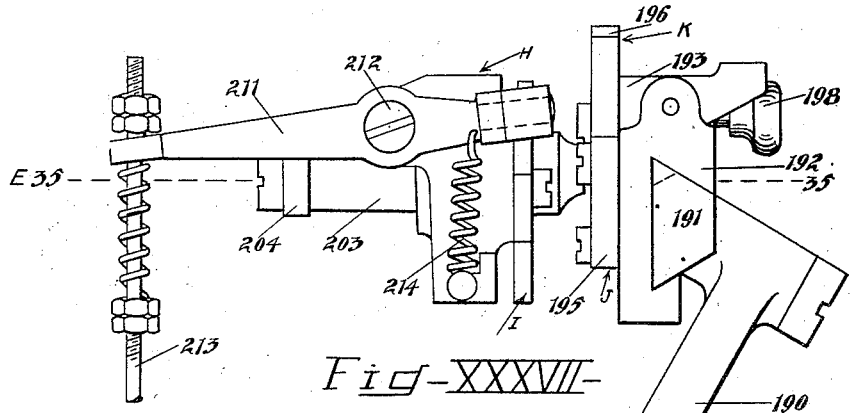
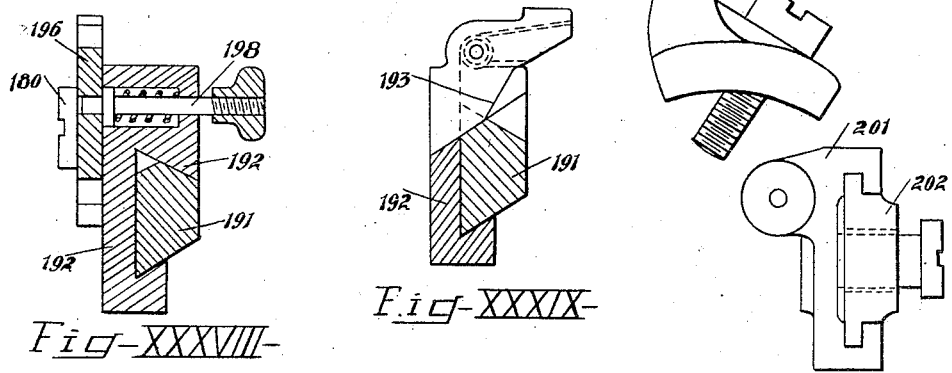
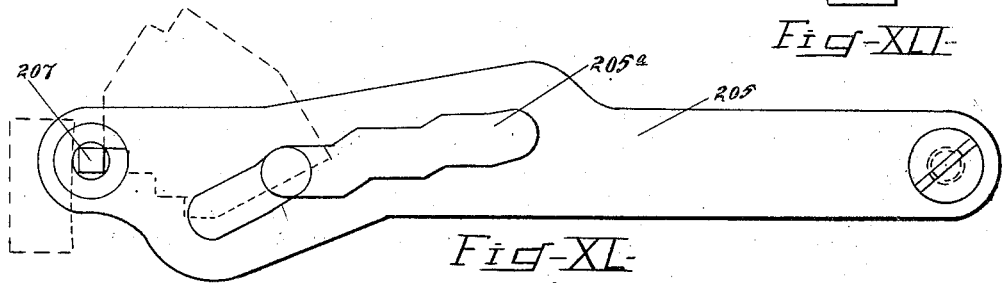
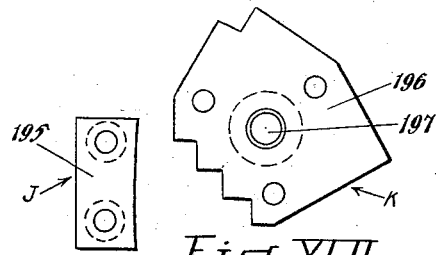

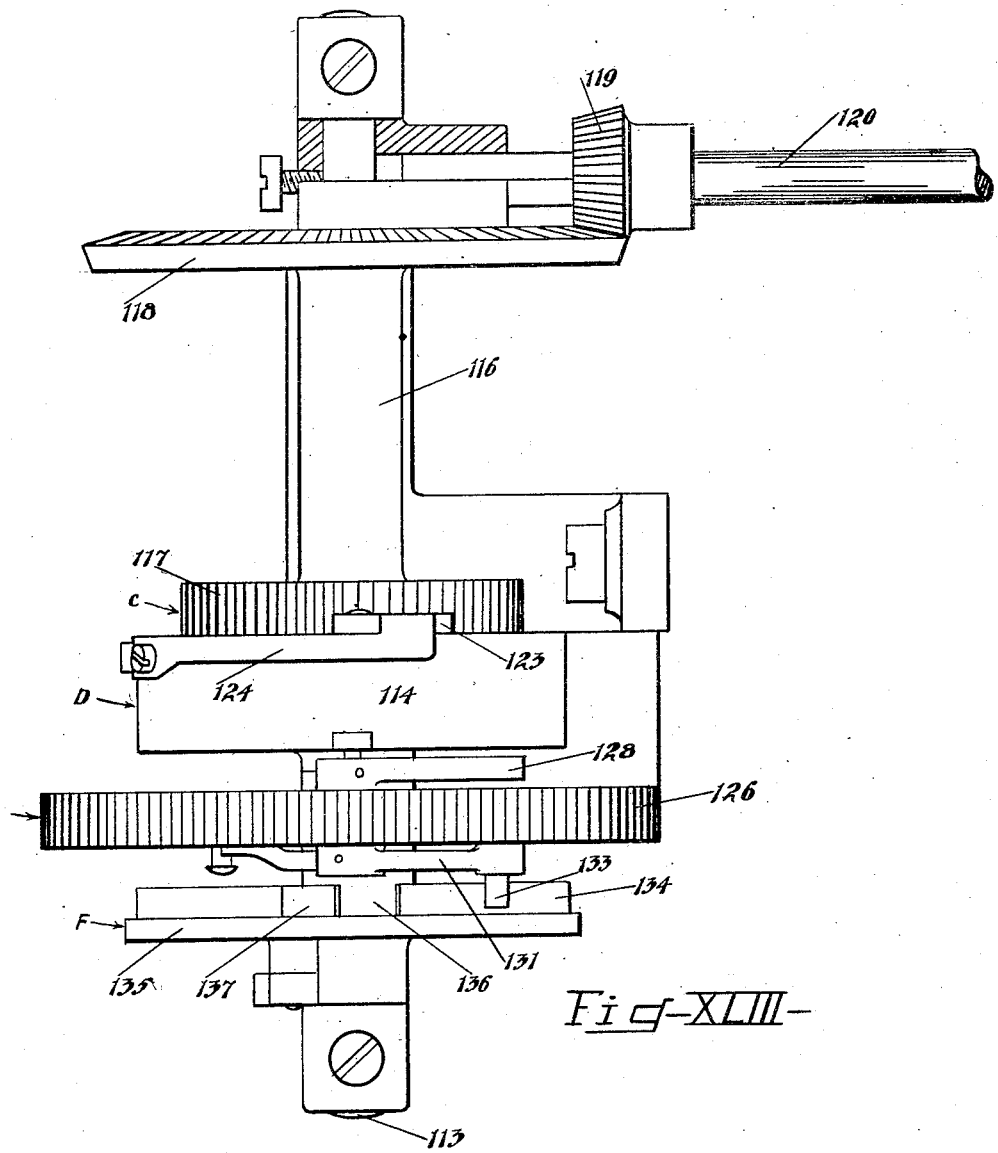

W. A. BURNOP, DEC'D.
E. A. BURNOP, ADMINISTRATRIX.
COMPUTING AND REGISTERING MECHANISM.
APPLICATION FILED SEPT. 8, 1909.
1,004,682.
Patented Oct. 3, 1911.
18 SHEETS—SHEET 16.
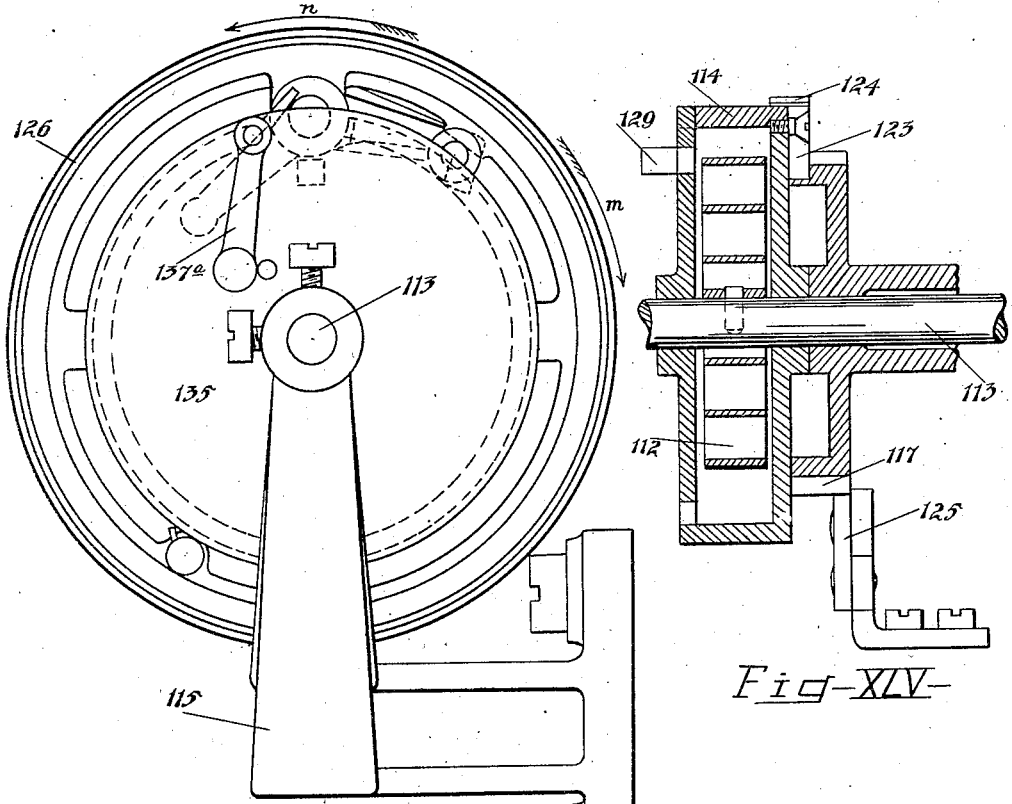
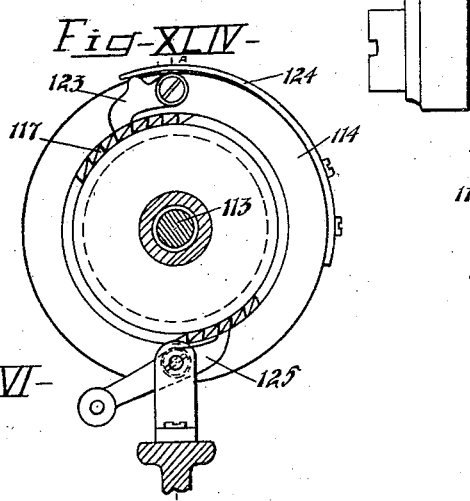
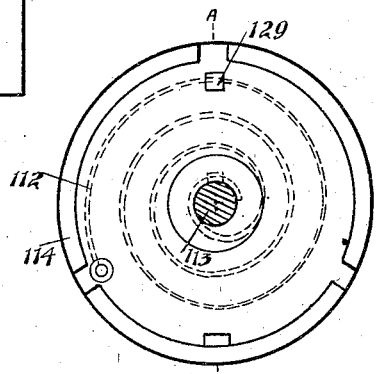
Witnesses
L. C. Snyder.
C. M. Sweeney
Inventor
WILLIAM A. BURNOP, DECEASED.
ESTHER A. BURNOP, ADMX.
BY
Attorneys

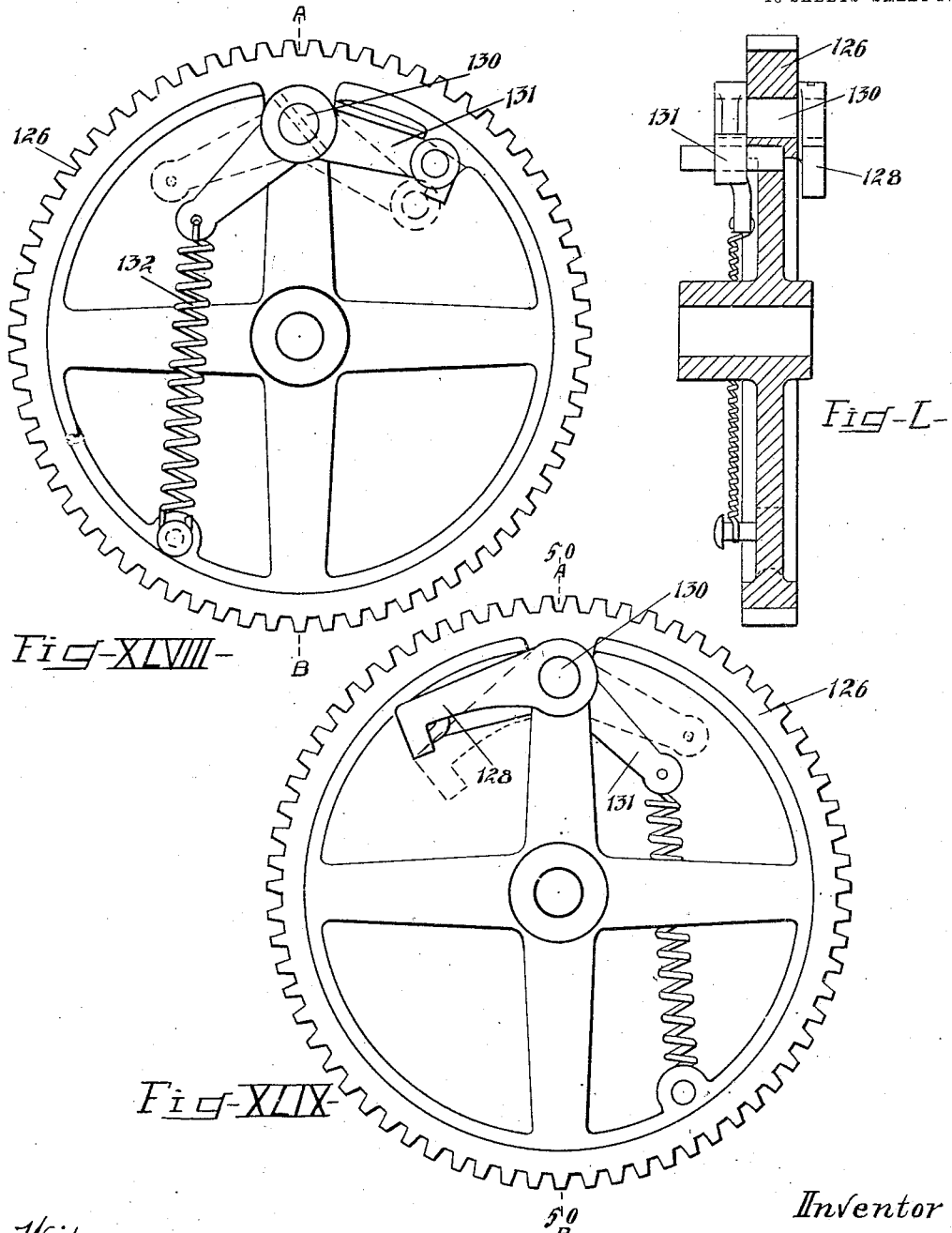

W. A. BURNOP, DEC'D.
E. A. BURNOP, ADMINISTRATRIX.
COMPUTING AND REGISTERING MECHANISM.
APPLICATION FILED SEPT. 8, 1909.
1,004,682.
Patented Oct. 3, 1911.
18 SHEETS—SHEET 18.
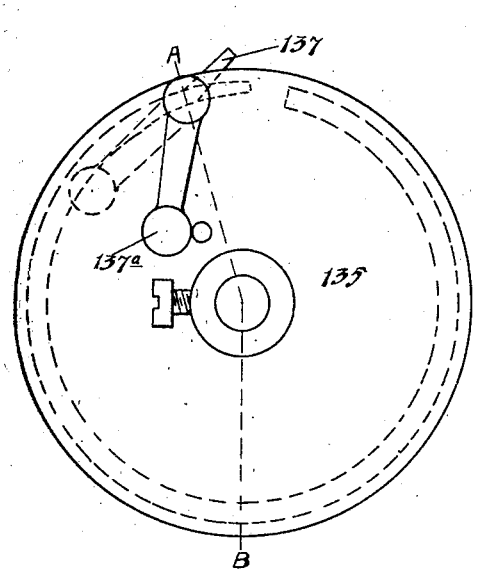
Fig-LI-
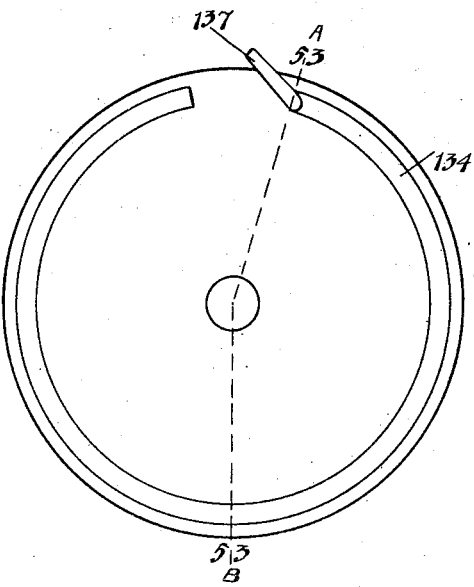
Fig-LII-
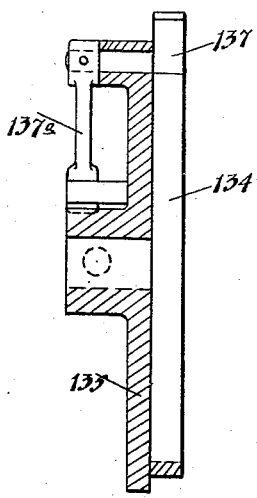
Fig-LIII-
Witnesses
L. C. Snyder
C. M. Sweeney
Inventor
WILLIAM A. BURNOP, DECEASED.
ESTHER A. BURNOP, ADMX.
By
Ashburton Martin & Jones
Attorneys

UNITED STATES PATENT OFFICE.

WILLIAM A. BURNOP, DECEASED, LATE OF DEERFIELD, NEW YORK; ESTHER A. BURNOP, ADMINISTRATRIX, ASSIGNOR OF ONE-HALF TO GEORGE H. SPITZLI, OF UTICA, NEW YORK.

COMPUTING AND REGISTERING MECHANISM.

1,004,682.  Specification of Letters Patent.  Patented Oct. 3, 1911.

Application filed September 8, 1909. Serial No. 516,753.

*To all whom it may concern:*

Be it known that WILLIAM A. BURNOP, late of the town of Deerfield, county of Oneida, and State of New York, having invented certain new and useful Improvements in Computing and Registering Mechanism and subsequently having departed this life, I, ESTHER A. BURNOP, administrator of said WILLIAM A. BURNOP, deceased, pursuant to letters of administration issued by the surrogate's court of the county of Oneida on the 4th day of May, 1908, and acting as such, do hereby declare that the following is a full, clear, and exact description of said invention, which will enable others skilled in the art to which it appertains to make and use the same, reference being had to the accompanying drawings, and to the letters of reference marked thereon, which form part of this specification.

Generally stated, the object of the invention is to provide a computing and registering device, which is certain in its operation, easily and conveniently operated and generally effective.

The invention as hereinafter shown and described is particularly adapted to use on or in connection with a typewriting machine, although it is adapted to be used independently of a writing machine.

In the device about to be described the power for working the computing and registering mechanism is not derived from the keys. The keys are utilized to release the mechanism. They may all have the same length of stroke and require always the same blow or stroke to operate them without reference to whether much or little of the computing and registering mechanism is at the time operating.

In the mechanism about to be described the power to operate the computing and registering mechanism is derived from a spring motor wound to the extent it has run down by or in connection with the return of the typewriter carriage. A variable escapement mechanism controlled by the keys allows the motor to operate the computer to the extent required at each operation of a key. Mechanism for throwing into operation and throwing out of operation the computing mechanism during a certain definite but changeable part of the travel of the typewriter carriage is provided. Features of novelty exist in the computing and registering mechanism, the motor or driving mechanism and the release or escapement mechanism (which generally speaking are the main parts of the machine) and considered separately and independently. The computing mechanism is adapted to add and subtract as well as register the amount.

Figure I is an end view of the machine embodying the present improvements in connection with more or less outlined form of a common form of typewriter in connection with which the improvements are illustrated. Fig. II is a rear elevation of the same. Fig. III is an end view on a larger scale of the computer. Fig. IV is a side elevation on substantially the same scale of the computer from the front side with the front portion of the computer casing removed. Fig. V is a longitudinal sectional view of the computer taken on line 5, 5 of Fig. III, the same sectional line also being shown in Fig. VI. Fig. VI is a cross-sectional view of the computer taken on line 6, 6 of Figs. IV and V. Fig. VII is a partial longitudinal section of the computer taken on line 7, 7 of Fig. VI. Fig. VIII is a detailed view, partially in section, the section being taken on line 8, 8 of Fig. V. Fig. IX is a detailed view of a bearing employed in the computer. Fig. X is a detailed view, partially in section, taken on line 10, 10 of Fig. V (also seen in Fig. IV) of a latch or catch securing parts of the computer mechanism. Fig. XI shows details of a bearing in the computer mechanism partially in section taken on line 11, 11 of Figs. IV and V. Fig. XII is a detailed bottom view of a releasing bar employed in the computer mechanism. Fig. XIII is a detailed view of movable trips and their actuating mechanism employed in the computer. Fig. XIV is a detailed view on an enlarged scale of the driving gears, clutches and reversing mechanism of the computer as seen from the front. Fig. XV is a partial cross-sectional view of the mechanism shown in Fig. XIV. Fig. XVI is a longitudinal vertical section view of the mechanism shown in Fig. XIV. Fig. XVII is a bottom view of the mechanism shown in Fig. XIV. Figs. XVIII and XIX show details of the mechanism shown in Fig. XIV. Fig. XX shows a side elevation of that portion of the mechanism which for descriptive purposes is termed a variable escapement. Figs. XXI and XXII show other side elevations of the same with certain details, however, at the top removed. Fig. XXIII show a bottom view of the same. Fig. XXIV shows a top or plan view of the lower section of the case of the variable escapement with certain mechanism arranged therein. Fig. XXV shows in the main a section view taken on a line corresponding with 25, 25 of Fig. XXIV with certain movable parts, however, not in the position shown in Fig. XXIV. Fig. XXVI shows a section taken on line 26, 26 of Fig. XXV. Fig. XXVII is a detailed section view taken on line 27, 27 of Fig. XXIV. Fig. XXVIII is a detailed sectional view of a stop pin employed in the variable escapement mechanism in connection with details of operating mechanism thereof. Fig. XXIX is a detached detailed view of the pin. Fig. XXX is a plan view showing arrangement of keys and key levers and immediately connecting mechanism. Figs. XXXI and XXXII are detailed sectional views taken on lines 31, 31 and 32, 32 of Fig. II. Fig. XXXIII is a detailed plan view of the mechanism for bringing into and throwing out of operation the computing mechanism during a certain part of the movement of the typewriter carriage. Fig. XXXIV is a front side elevation of the same plus a few small details. Fig. XXXV is a longitudinal sectional view on line 35, 35 of Fig. XXXIV, the same sectional line also appearing in a later figure. Fig. XXXVI is a front elevation of certain parts of the mechanism as shown in the prior three figures. Fig. XXXVII is an end view of the mechanism shown in Fig. XXXIV. Fig. XXXVIII is a partial section taken on line 38, 38 of Figs. XXXIII and XXXIV. Fig. XXXIX is a partial section taken on line 39, 39 of the same figures. Fig. XL is a detailed view with diagrammatic additions of a controlling arm employed in the construction illustrated in Fig. XXXIII and subsequent figures. Fig. XLI is an end view of the parts shown in XXXVI. Fig. XLII is a detailed view of parts of the construction illustrated in Figs. XXXIII, etc. Fig. XLIII is a plan view of the motor mechanism with some of the parts shown in section and some parts shown shifted out of normal position to simplify the projection. Fig. XLIV is an end view of the mechanism shown in Fig. XLIII. Fig. XLV is a sectional view of portions of the motor mechanism particularly as to the spring case. Fig. XLVI is a side elevation of the spring case on which is superimposed a ratchet wheel and details of ratchet pawls operating in connection therewith. Fig. XLVII is a side elevation of the spring case as shown from left of Fig. XLV showing the spring also in dotted outline. Figs. XLVIII and XLIX show left and right sides respectively of a gear pinion and coöperating parts employed in the motor mechanism. Fig. L is a vertical section of the wheel and parts shown in the last two figures referred to and taken on line 50, 50 of Fig. XLIX. Figs. LI and LII show the left and right-hand sides respectively of a cam bolt and its appurtenances constituting part of the motor mechanism. Fig. LIII shows a section of the same taken on line 53, 53 of Fig. LII.

The body of the computer consists of an angular frame 60 (Figs. II and VI) constituting the top wall and rear wall of a casing containing the bulk of the mechanism, to the ends of which are firmly secured the end walls 61 and 62 (Figs. IV and V) constituting farther portions of the frame. The balance of the case is formed with a removable sheet metal front and bottom piece 63 (Figs. III and VI.). Arranged within the case thus formed is a set of independent rotatable computing and registering rings or disks $64^a$, $64^b$, $64^c$, etc., (Figs. IV and V.) nine of such being shown in the drawings. These registering wheels or rings are mounted in the case as follows:

Referring to Figs. IV., V., and VI., a bearing bar 65 is provided firmly secured in the top of the frame and having a set of dependent hangers $65^a$, the lower edges of which are made semi-circular to constitute the upper half of the bearings for the registering wheels or rings 64. The lower portion of the bearing is formed by a removable spring clip 66, the upper projecting arms of which are adapted to snap over the spreading or flaring sides of the hangers $65^a$ as shown in Fig. VI. Externally on one of its threaded cylindrical ends the registering ring or wheel $64^a$ is provided with a one-toothed gear ring 67 (Figs. V. and VIII) wedging on or swet on to the ring or wheel, whereby it becomes substantially an integral part thereof. Each of the other computing or registering rings $64^b$, $64^c$, etc. are provided with a similar ring 67. Each of the other registering rings or wheels $64^b$, $64^c$, etc. are also provided on the opposite end of the reduced cylindrical portion with a gear pinion ring 68 having teeth around its entire circumference, and also wedged or swet on to the body of the ring whereby it becomes substantially a fixed integral portion thereof. The rings 67 and 68 together with the body portion of the rings, or wheels which carry the characters embossed on their peripheral faces, fully occupy the spaces between the bearings in the hangers $65^a$, whereby the rings or wheels are held against longitudinal movement in the case.

It will be observed that each of the wheels or rings $64^a$, $64^b$, etc. have a relatively large opening through the center of each and at the end of each are provided with an inwardly projecting flange 69 through which ten notches are cut, converting it essentially into an internal circular rack having ten teeth, one of which 70 is an elongated tooth extending inwardly beyond the general circular line, which determines the inner end of the others. Extending longitudinally through the openings in the several registering wheels or rings and through the case of the computer is an actuating shaft 71 rotatably supported in bearings 72 and 73 in each of the ends 62 and 61 respectively. This shaft is freely rotatable and in addition has a slight longitudinal movement in the case. It is also for the greater part of its length slotted longitudinally to receive the sliding key 75. At suitable intervals, hereafter to be referred to, the key 75 is provided at opposite points with projections 75$^a$ adapted at their ends to engage in the notches in the flanges 69 of the registering wheels. Arranged along one side of the shaft 71 in a longitudinal row and spaced at distances equal to the length of the registering wheels is a set of shorter projections 71$^a$ adapted when the shaft 71 is shifted slightly longitudinally and rotated to engage with the long tooth 70 of the internal rack of the registering wheels. The projections 75$^a$ on the key 75 are progressively arranged. In the normal initial position, as shown in Fig. V, the first pair of key projections 75$^a$ on the left-hand end of the key 75 will rotate with the internal rack of the left-hand registering wheel 64$^l$, while the next pair of projections 75$^a$ to the right will just fail to register with the internal rack of the second wheel 64$^h$ requiring a one step movement to shift the key 75 to the left, from the position shown in Fig. V to bring them into registering position. The third set of projections 75 are two steps off. The fourth pair, three steps off and so on throughout the set. For controlling the longitudinal movement of the key 75 in the shaft 71 at the right-hand end it is provided with projections 76 and 77, which engage on opposite sides of the longitudinal movable bearing 78 (Figs. V and XI) in which bearing the shaft 71 also rotates. The bearing 78 is fixed on the sliding bar 80 (Figs. V, X, and XI) running in ways in the back of the frame or case adjacent to the right-hand end of this bar. For manually operating the shaft 71 on the right-hand end externally of the case it is provided with a knob 71$^b$.

For connecting up the registering rings or wheels 64$^a$, 64$^b$, etc., so that once in each revolution each lower wheel or ring will rotate one or more of the higher ones one-tenth of a revolution, there is provided an intermittent gearing consisting of pairs of gear wheels 81 and 82 (Figs. IV., V. VI and VIII.) preferably formed together on a single hub loosely mounted on a fixed shaft 83 extending longitudinally of and supported in the computator case. The wheel 81 is of the form shown in Fig. VIII and meshes with the one-toothed gear 67 of the registering ring. The gear wheel 82 is of the regular toothed pattern and meshes with the gear wheel 68 of the registering ring. Each pair of the wheels 81 and 82 are laterally movable along the shaft 83 to disengage the gear wheel 82 from the gear wheel 68. To this end the gear wheel 67 is wide on its face permitting lateral shift without disengagement between the wheel 67 and 81. For shifting this intermittent gearing and controlling the position, there are provided a number of bell crank levers 84$^a$, 84$^b$, etc., Fig. VII, mounted on fixed pivots on the back of a computator casing. The downwardly extending projecting arm of each of these bell cranks carries a projection 85 extending in between the gear wheels 81 and 82. The upper lateral extending branches of the bell cranks 84$^a$, 84$^b$, etc., are each provided with a tooth-like upwardly standing end adapted to be engaged by trips 86$^a$, 86$^b$, 86$^c$, etc., all pivotally mounted on the sliding bar 80. These trips 86$^a$, 86$^b$, etc., are progressively mounted on the bar 80. It will be seen by reference to trip 86$^a$, as shown in Fig. VII, that it is active in operating the bell crank 84$^a$, while the next trip to the right marked 86$^b$ is inactive but in a position to become active on the next movement of the bar 80 toward the left, as shown in Fig. VII. The third trip 86$^c$ is two steps from an active position, while the fourth trip is three steps from an active position, and so on through to the end. When any one of the trips become active, as for instance 86$^a$ in Fig. VII, the pair of intermittent gears controlled by this trip is shifted from its normal lefthand position to the right-hand position, as shown in dotted lines in Fig. VII, and in full lines in Figs. V and IV. When shifted, as described, the registering ring 64$^i$ is disconnected from the following registering rings and is in position for independent movement. When a trip passes out of engagement with the lever which it operates, the intermittent gear wheels 81 and 82 are shifted back into their normal position by the operation of spring 88. In order to make the trips 86$^a$, 86$^b$, etc., retractable in order that the mechanism may be returned to normal starting position, each trip is adapted to be operated by a connecting link as 89, the lower end of which is pivotally connected to the trip while the upper end is pivotally connected to a supplemental operating bar 87 mounted for independent limited sliding movement on the main bar 80. When in the perpendicular position, as shown in Fig. VII, it is obvious that the links 89 will lock the trips down. When the supplemental bar 87 is shifted to the right hand position with reference to the bar 80, the links will be given an inclined position, as shown in dotted lines in Fig. XIII, elevating the operative tooth of the trip so as not to interfere with the levers 84ª, 84ᵇ, etc., when the bar 80 and the supplemental bar 87 are shifted from left to right hand position, as shown in Fig. VII. In order to insure the supplemental bar 87 to be in proper relation to the main bar 80 before the computator can be operated in regular course and particularly to insure the links 89 being in their vertical position and the trips in their active positions, there is provided on the back of the computator casing a pawl catch 90 thrown into its normal active position by a spring, as shown. This catch 90 is adapted to coöperate with another catch 91 pivotally mounted on the bar 80. The catch 91 is operated by a link 92 pivotally connected at one end to the catch and at the other end to the supplemental bar 87, the link 92 operating reversely to the links 89. Thus when the bar 87, being the bar to which the motive power is applied, is moved in the direction from left to right, as shown in Fig. VII, it will shift its position to a limited extent longitudinally on the bar 80. In so doing the several links 89 operate to withdraw the trips 86ª, etc., and the link 92 operates to turn down the catch 91. In the retracting movement the spring holding up the catch 90 allows the catch 91 to be retracted over. When power is applied in the reverse direction to the bar 87 in case the bar 80 should have a tendency to follow it before the links 89 are straightened up and the trips thrown down the catch 91 will engage with the catch 90, and detain it until the supplemental bar has made the preliminary movement, at which time the catch 91 is moved out of the way and the bar 80 is free to perform its regular forward movement.

For the purpose of resetting the several registering rings 64ª, 64ᵇ, etc., it is necessary to disconnect the intermittent gearing. For this purpose there is provided a common release bar 93, (Figs. VII and XII) which has projections 93ª adapted to engage with the downwardly projecting arms on the several levers 84ª, 84ᵇ, etc. This release bar has an arm 93ᵇ, (Fig. V) which engages between collars on the shaft 71 so that when the shaft is operated longitudinally the bar 93 is also operated longitudinally and the several intermittent gearings thrown out of mesh.

For operating the sliding bar 80 with its supplemental bar 87, there is provided in the top of the computator case a rock shaft 94 (Fig. III) carrying on the rear end an arm 95, (Figs. III and VI) which is connected by a connecting bar 96 (Fig. II) with one end of the supplemental bar 87. On the forward end the rock shaft 94 is provided with a crank 97 to which the operating mechanism hereafter described is connected.

For moving the shaft 71 longitudinally toward its left hand position, as shown in Fig. V, there is provided a spiral spring 98 interposed between a collar on the shaft and the bearing 72. For positively locking the shaft 71 against longitudinal movement with reference to the case, there is provided a latch 99, (Figs. V and X) the operative end of which is adapted to drop in between a collar on the shaft and a flange on the end of the bearing 72. To disengage this latch 99 there is provided on the slide bar 80 a cam projection 100, which is adapted to engage with and disengage this latch 99 when the bar 80 is moved to its right hand position as the mechanism is shown in Fig. V.

On the left hand end of the shaft 71, as the device is shown in Figs. IV and V, there is provided a clutch member 101 secured to the shaft against rotation and spaced sufficiently away from the end of the bearing 73 to permit the longitudinal movement of the shaft 71, before referred to. The other member of the clutch is indicated by 102 (Fig. XIV) and is mounted and secured on the end of a short shaft 103 (Figs. XIV, XV and XVI). For a bearing at one end the shaft 103 runs loosely in the clutch member 101, while the other end of the shaft 103 is supported in a bearing 104 carried by a suitable bracket arm. Mounted on and running freely and independently on the shaft 103 are two beveled gear pinions 105 and 106, both meshing with a gear pinion 107 secured on the upper end of the vertical driving shaft 108, which shaft 108 is connected with the motor and escapement mechanism hereafter to be described. On their adjacent faces the gear pinions 105 and 106 have and include clutch members adapted to engage with a double clutch member 109 sliding along and splined to the shaft 103. For shifting the clutch member 109, there is provided a rocker 110 having knobs engaging in a circumferential groove in the clutch member and provided with a handle and a toothed segment 110ª (Fig. XIX) adapted to engage with a click 111 supported in the frame carrying the rocker 110. The arrangement of the parts just described is such that the clutch member 109 can be shifted to a middle position, whereby it will not be in engagement with either of the driving pinions 105 or 106. It may also be shifted into engagement with either of the driving pinions 105 or 106 whereby the shaft 71 will be rotated in one direction or the other depending on how it was engaged. The clutch members 101 and 102 are not disengaged by moving the shaft 71 longitudinally, as before pointed out.

The motor for driving the computator has a main spring 112, (Figs. XLV and XLVII) one end of which is secured to the fixed shaft 113 while the other end is secured to the revolving spring case 114. The shaft 113 is mounted secured against rotation in a suitable bracket or frame 115 and has mounted thereon a revoluble sleeve 116 (Fig. XLIII) carrying a ratchet wheel 117 at one end, having a space of double width for the engagement of two pawls and a relatively large beveled gear wheel 118 (Figs. I, II, and XLIII) at the other end. The beveled wheel 118 meshes with the beveled gear pinion 119 secured against rotation on the shaft 120, which shaft is mounted in suitable bearings for free rotation and carries also the beveled gear wheel 121 meshing with a pinion 122 secured against rotation on the computator driving shaft 108 before referred to. The spring case 114 carries a pawl 123 adapted to engage with the ratchet wheel 117 and thrown into engagement by a spring 124. For holding the ratchet wheel 117 against rotation otherwise than in its normal forward direction, particularly when the pawl 123 is being retracted around the periphery of the ratchet wheel, there is provided mounted on a fixed support a holding pawl 125 (Fig. XLVI) engaging with the other portion of the face of the ratchet wheel 117 and counterweighted to throw into engagement by gravity. Mounted opposite the spring case 114 on the shaft 113 to rotate freely and independently is a gear pinion 126. This pinion is adapted to mesh with a pinion 127 secured on the ordinary drum provided on the typewriter machine, which is connected with the carriage by a strap which serves to move the carriage when released by the escapement, so that the gear wheels 127 and 126 are rotated alternately, first in one direction and then in the opposite direction in connection with the movement of the carriage of the typewriter.

It may be noted that during the writing operation on a typewriter the carriage moves from right to left as it is released by the escapement, and is ordinarily returned by the operator by hand from left to right. On the side of the gear wheel 126 next to the spring case there is mounted a hook 128 (Figs. XLIII, XLIX and L), which is adapted under certain circumstances to engage with the pin 129 (Figs. XLV and XLVII) secured in one side of the spring case to rewind the spring. The hook 128 is secured on one end of a rock pin or shaft 130 extending through the gear wheel 126. Mounted on the other end of the shaft 130 is a changeable arm lever 131. To one arm of the lever is attached a spring 132 (Fig. XLVIII) tensioned to rock the shaft 130 and throw out the swinging end of the hook 128, so that it will not normally engage with the pin 129. The other arm of the lever 131 is provided with the pin or roller 133 (Fig. XLIII) adapted to engage with the lateral projecting circular flange 134 (Figs. XLIII, LII, and LIII) formed on the stationary disk or plate 135, which plate occupies a position close to and in a plane parallel with that of the gear wheel 126 on the opposite side thereof from the spring case 114. The flange 134 is nearly a complete circle but has at one point an opening or cut-out as indicated at 136, which opening is adapted to be closed by the movable tongue 137. This tongue is normally held in open position by a counterweighted arm 137ª. As the typewriter carriage moves from right to left in the writing operation the gear wheel 126 will be rotated in the direction indicated by the arrow $m$ in Fig. XLIV, and the projection 133 will be followed around the flange 134 in the same direction. In case the projection 133 during this movement passes the opening 136 by reason of the operation of the spring 132 if on the inside of the flange 134 it will pass through the opening 136 on the outside of the flange. When the typewriter carriage is being returned the gear wheel 126 will be rotated in the direction shown by the arrow $n$ in Fig. XLIV. Likewise the projection 133 will be moving in the same direction. As it comes to the opening 136 it will be forced from the position at the outside of the flange 134 into its position inside of the flange 134 by operation of the tongue 137. In so doing the tension of the spring 132 is overcome and the swinging end of the hook 128 is moved inwardly toward the right sufficiently to adapt it to engage with the spring case projection 129 when it shall find it in the course of the revolution around the shaft. The gearing between the spring case 114 and the computator mechanism is such that the spring case 114 will never be required to make more than one revolution before the typewriter carriage will be returned by the operator. It may be noted that the maximum motion to be imparted to the computator by the motor would only be required under ordinary conditions when the number "9" was being registered on all of the registering rings or disks. Some leeway over the maximum requirement of the motor may well be provided for in order that one or two subtractions may be made on the register to correct errors. In case the computator has been operated to its maximum extent during the writing of a line on the typewriting machine, the spring casing 114 with its appurtenances may have nearly made one revolution. When the carriage is returned it is desired to rewind the spring 112 to the extent that it has been run down and that only. When the carriage is returned the hook 128 is thrown in as the projection 133 follows around the flange 134 at the time that it comes into engagement with the tongue 137. When thrown in the hook 128 follows around until it finds the pin 129 and then carries the spring case along with it to the normal starting point, which as the machine is illustrated is directly at the top. At the time this point is reached the projection 133 is passed downward through the opening 136 in the flange and the hook 128 is released. At the time that the spring is being rewound the pawl 123 is retracted over the face of the ratchet wheel 117, and when the spring case is released by the hook 128 this pawl serves to secure the spring case and hold the spring against unwinding, except when its power is being utilized. In order to allow sufficient leeway in the length of lines being written on the typewriter, and size and arrangement of parts will preferably be such that the gear wheel 126 will make about one and three-fourths revolutions to a full movement of the typewriter carriage. This enables the motor rewinding mechanism described to perform its functions even though the typewriter is being used to write short lines.

For controlling the movement of the registering mechanism of the computator and holding in check the motor mechanism, the driving shaft 108 at its lower end is extended into the variable escapement mechanism casing 140 (Figs. I, II, XX, XXI, XXII, XXIII and XXV), and has secured to its lower end a disk 141 (Figs. XXV and XXVI). In this disk are mounted in a circle ten stop pins 142 having enlarged heads at their upper ends and adapted to be projected below the lower face of the disk 141 as to their lower ends. In order to hold the pins 42 against any tendency to shift their positions through the disk 41 by gravity or otherwise than through medium of the parts provided for operating them, they are provided friction springs 143 arranged in a circumferential groove in the periphery of the disk and consisting of a spring wire interwoven with the pins, as shown particularly in Fig. XXVI.

Mounted to slide vertically on the shaft 108 but held from rotation in connection therewith is a pin lifter 144. As to its lower part the lifter 144 consists of a disk or plate adapted to engage under the edge of the heads of the pins 142, except as to one pin. As to this one pin the lifter is provided with a cut-out, as indicated at 145. For raising and lowering the lifter 144 there is provided a fork 146 mounted on a rock shaft 147 in the case and having knobs on its swinging end engaging in a groove in the upper part of the lifter. The lifter is held against rotation in the case and with reference to the shaft by a stationary key 148 engaging in a suitable catch in the edge of the upper part of the lifter. Arranged in the bottom of the case 140 in a circular position are ten other stop pins 150. These are provided with heads and ears 151 at their lower ends, the ears being located outside of the case. These pins are adapted to be projected upwardly through the bottom of the case so as to engage with the downwardly projecting ends of the pins 142, but nine of them are normally held down or withdrawn from their projected positions by springs 152. The tenth pin, which will be denominated the zero pin and is particularly indicated by 150$^a$, on Figs. XXIII, XXVIII and XXIX, is connected at its lower end to an arm 154 mounted on a rock shaft 155 in a bearing on the lower portion of the case 140. The rock shaft 147 before mentioned is provided with an arm 147$^a$, (Fig. XXI) while the rock shaft 155 is provided with an arm 155$^a$, and these two arms at their swinging ends are connected by a connecting rod 156. The two rock shafts 147 and 155 with the other connected parts are moved to their normal position by a spring 157. On the opposite end from that carrying the arm 147$^a$, the rock shaft 147 is provided with a downwardly projecting arm 158 (Fig. XX) through which power is supplied for operating the pin lifter 144 and the zero pin 150$^a$. At one point in the top of the case 140 there is secured a depressing cam 160 (Fig. XXVII) adapted to operate on the heads of the stop pins 142 and force them into their lower position as the disk 141 is revolved, moving the pins through under the cam. This cam 160 is necessarily located at a position corresponding with the cut-out or recess 145 in the periphery of the disk or plate portion of the lifter 144. To each of the nine pins 150 before referred to by suitable connecting links are attached the operating levers 165, 166, 167, 168, 169, 170, 171, 172 and 173 (Figs. II and XXXI). These levers are each pivoted on the frame and are severally under the control of the typewriter keys as will hereafter be pointed out. The lever 158 before referred to controlling the pin lifter and the zero pin is adapted to be engaged and operated by a hook 175$^a$ mounted for a limited horizontal movement on an upwardly standing arm of a reciprocating frame 176$^a$ mounted on the typewriter frame, and under the common control of all the numerical keys of the typewriter, as will later be more fully pointed out. Under normal conditions on the escapement device the zero pin 150$^a$ will be projected or held in its uppermost position, as shown in Fig. XXVIII, while all the pins 142 of the upper set will be lifted except one, to-wit: the one located opposite the recess 145, which the lifter will fail to raise when operated. So that under normal conditions the zero pin will be projected upwardly, and one pin of the upper set will be projected downwardly and these two will engage and prevent the rotation of the shaft 108 under the influence of the motor. If now the zero pin 150$^a$ be withdrawn, there will be nothing to hinder, and the shaft 108 with the disk 141 carrying the upper set of stop pins will begin to rotate and in connection with the gearing, all being connected up, of course, the computator registering wheels may be rotated. As the pins 142 pass around the circle under the cam 160 those following the one which was normal will be forced downwardly. The connection with the operating keys of the typewriter is such that at the time the zero pin 150$^a$ is withdrawn some one of the other nine pins 150 will have been pushed up.

The pin of the upper set that was formerly down will rotate around with the shaft 108 until it is stopped by the said pin that is pushed up. This rotation in the device as illustrated may be one-tenth of a revolution of the shaft 108, or nine-tenths of a revolution. When the shaft 108 has been stopped the pin, which was pushed up from the lower set, is withdrawn and the zero pin again pushed up. As the zero pin is pushed up it will take its position directly in front of the last pin of the upper set that has been pushed down by the cam 160. At the time that the zero pin is pushed up all of the pins of the upper set are elevated by the lifter 144, except the last one that has been pushed down by the cam 160. This one is not elevated for the reason that it is located in the recess 145 of the periphery of the lifter plate.

In the particular form of typewriter to which these improvements are shown applied, the type bars are actuated by rocking shafts extending from front to rear of the machine. In the diagram view, (Fig. XXX,) only these rock shafts are shown which are adapted to operate type bars carrying the figures from 1 to 9 inclusive. Four rocking type bars 175, 176, 177 and 178 (Figs. I and II) are shown on one side of the machine, and four similar rocking type bars are shown on the other side of the machine and numbered 180, 181, 182 and 183. The still remaining rocking type bar is indicated by 184 and is located between the other sets. Each of these rocking type bars has a projection as 185 adapted to engage with the universal bar or frame 176 and move it from right to left as the same is shown in Fig. II when any one of the shafts are rocked. The frame 176$^a$ is returned to its normal position by a spring 186. Each of the rocking key shafts 175, 176, etc., are provided with a projection or cam 187 adapted to engage with one of the levers 165 to 173 inclusive, whereby the levers are operated and through the medium of these levers the pins 150 of the lower set in the escapement are severally controlled and projected. The several levers 165 to 167 and 169 to 173 inclusive are arranged in the various vertical planes, as shown in Fig. XXXI, particularly whereby they are adapted to independent movement without interference from one another. In order to locate the cam projections 187 on the rock shafts with respect to their respective levers, which they control, some of the rock shafts are more extended than others, as readily appears from Fig. I. The rocking key shafts 175 to 184 inclusive are adapted to be operated by keys as 188 arranged in a convenient position to be struck by the operator's fingers in the usual manner of typewriter keys. For convenience in illustrating and describing these keys and the rock shafts which they control, they are numbered with numerals 1 to 9 inclusive, the same corresponding with the characters carried by the type bars of the typewriting machine.

Mounted on the typewriter carriage by means of brackets 190 (Figs. I and II) is a bar 191 (Figs. XXXVII, XXXVIII, and XXXIX) extending longitudinally of the typewriter carriage and parallel with the ways on which the typewriter carriage operates. Mounted on for longitudinal adjustment along the bar 191 as an adjustable stop carriage 192 (Figs. XXXII and XXXV). For locking this carriage at any desired point of adjustment along the bar, there is provided a catch 193, the operative end of which is adapted to engage in notches as 191$^a$, which may be provided in the edge of the bar 191. Secured on the rear of the stop carriage 192 in a fixed position is a stop 195 (Fig. XLII) somewhat elongated in a vertical direction and of a definite length in a vertical direction. Also mounted on the back of the stop carriage 192 is an adjustable stop 196 mounted for rotation on a central pin 197 and adapted to be secured in any of its three set positions by a spring supported push pin 198 mounted in the top of the stop carriage 192, the projecting end of which is adapted to engage in one of the three holes in the stop 196 to secure it in its adjusted position.

The computator heretofore described may be supported from the typewriter frame by brackets 200 (Figs. I and II), which may be also utilized to support in a fixed position in a line parallel with and immediately to the rear of the bar 191 the slideway 201 (Figs. XXXIII to XXXVI). In this slideway is mounted for free longitudinal movement to a limited extent a sliding controller carrier 202. Projecting to the rear through a slot in the part 201 and secured in the part 202 is a stud 203 to which is secured one end of a connecting rod 204; the other end of said connecting rod being secured to the swinging end of arm or lever 97 before referred to. On the front side of the slide or controller carrier 202 is located the controller 205 pivotally secured to the carrier at one end at 206. The opposite end of this controller 205 is more or less free to make a vertical movement and carries a projection 207 (Figs. XXXV and XL) adapted to engage with the stops 195 and 196 before referred to. Adjacent to its swinging end the controller 205 is provided with a cam slide of peculiar angular form shown in detail in Fig. XL and indicated by 205$^a$. A fixed stud 208 is provided mounted in the slideway 201 passing through the cam opening 205$^a$. In order to reduce the friction on this stud a roller may be utilized as shown in Fig. XXXV. Briefly it may be noted at this point that as the typewriter carriage moves along in one direction, the stop 196 is adapted to engage with the projection and move the controller 205, the slide 202, the projection 203 and the connecting rod 204 in one direction, that is to say: in the direction indicated by the arrow G on Fig. XXXV. Also that when the typewriter carriage is moved in the opposite direction from that shown by the arrow in Fig. XXXV, the projection 207 is adapted to engage with the stop 195 and the parts before described are adapted to be moved in the same direction. The extent of control and the exceptions will be pointed out later. The slide or controller carriage 202 has secured thereto a cam 210, which is adapted to coöperate with a roller on one end of the tilting lever 211 (Fig. XXXVII) mounted on a fixed pivot at 212. At its rear end the lever 211 is connected by a connecting rod 213 with the hook or latch 175$^a$ on the universal frame heretofore referred to. For throwing down the forward end of the lever 211 when not held by the cam plate 210 and drawing up on the connecting rod 215 and releasing the catch 175$^a$, there is provided a spring 214. When the elevated portion of the cam plate 210 passes under the roller on the end of the tilting lever 211, the spring 214 is overcome, the rod 213 is dropped down and the hook 175$^a$ is allowed to become engaged with the crank lever 158 of the variable escapement mechanism heretofore described.

In order to locate the column of figures on which the computing and recording attachment is to operate at any desired point on the paper on the platen in the typewriter, the stop carriage 192 will be adjusted along the rod 191 and secured at the desired point. As the carriage moves along in the ordinary course the arrangement of parts is such that the working part on the stud or projection 207 will pass over the top of the stop 195 without engagement therewith, but will come in contact with the active face of the adjustable stop 196. At this time the controller controlling stud 208 will be in the extreme left hand end of the controller cam slide 205$^a$, as this part is shown in Fig. XL. In the next movement of the carriage from right to left after the controller projection 207 has come to a bearing on the face of the stop 196, the controller 205 will be moved along in connection with the typewriter carriage in the direction from right to left, as shown in Fig. XL one step. As it has so moved along the projection 207 is slid downwardly along the active face of the stop 196 by reason of the inclination of the cam groove 205$^a$. The first movement of the controller 205$^a$ from right to left operating through the connections hereinbefore described, and particularly the connecting rod 204, the lever 97 and the connecting rod 96 is to move the supplemental bar 87 from right to left as the parts are shown in Figs. IV, V, and VII with reference to the main bar 80. The first two steps of this movement serve to straighten up the links 89 and force down into their active positions the trips 86$^a$, 86$^b$, etc. The third movement of the controller 205$^a$ toward the left in connection with the carriage serves through the medium of the connections heretofore pointed out to shift the bar 80 one step toward the left as the parts are shown in Figs. IV, V and VII. This movement serves to release the locking latch 99, which secures the shaft 77 against longitudinal movement and shift the key 75 longitudinally from right to left as shown in Fig. V one step. This movement of the key 75 serves to make the bits 75$^a$ thereof register with the internal rack of teeth of the first registering ring 64$^i$. This third step movement of the controller 205 also brings into operation the elevated part of the cam bar 210, the effect of which is to drop down the hook 175$^a$ and make the connection between the universal bar or frame and the releasing mechanism of the variable escapement. The fourth movement of the controller 205 which toward the left may take place in connection with the operation of a numerical key the number of which is intended to be registered on the computator. In connection with this last movement of the controller the projection 207 will be shifted down so as to become temporarily disengaged from the active face of the stop 196, as the same is shown arranged in Fig. XLII. The next movement of the typewriter machine carriage has no effect whatsoever on the computing mechanism. This movement is intended to be utilized for introducing a point or comma in the number being written. This idle motion brings the second step of the face of the stop 196 into engagement with the controller projection 207. During the next two step movements the stud 208 travels a substantially straight path in the controller cam 205ª, carrying the controller with its connecting mechanism along with each step movement of the typewriter carriage. The next following step brings the stud 208 into an inclined path in the cam 205ª and while the controller is carried along with this movement the stud 207 is also moved downwardly out of engagement with the second step face of the stop 196. At this point another lost step, so far as the movement of the carriage is concerned, is had which may be utilized for introducing another point or comma in the number being written. The same three steps just before described are again repeated when the carriage becomes disengaged and this last step may be utilized for introducing a period in the number being written. This is particularly useful when recording dollars and cents. The next two steps of the movement bring the controller 205 to the limit of its movement from right to left, as shown in Fig. XL, and disengages the controller projection 207 from the stop 196, leaving the typewriter carriage where it may travel farther without being connected with the registering mechanism. At the same time that the stop 196 loses complete control of the registering mechanism the roller of the lever 211 will run off the end of the raised portion of the cam plate 210 and the universal frame or bar will be disengaged from the variable escapement mechanism. When the typewriter carriage is returned by the operator the stop 195 will be brought along until it engages with the projection 207 of the controller. It will be noted in this connection that the lower end of the stop 195 projects below the plane of the lowest point of the stop 196. When the stop 195 picks up the controller in the return movement of the carriage, the controller 205 with its parts is moved from the left to the right hand position, as shown in Fig. XXXV. In so doing the projection 207 is slid up the active face of the stop 195 until it passes over the top of this stop when the controller is again released and the typewriter carriage can be released and the typewriting machine. The several stages of the movement of the controller stud 208 in the cam groove 205ª are indicated in Fig. XL. By rotating the stop 196 to bring its plane straight face into operative position adjacent to the stop 195, the mechanism is then adapted to write a solid line of figures without any points or breaks whatsoever. When the stop 196 is rotated to bring the side into operative position, which has only one step at the lower end, the mechanism is then adapted to write a solid line of figures with the exception of a decimal point inserted before the last two.

Numerous modifications and changes other than those hereinbefore referred to may be made without departing from the invention intended to be covered by the claims. The same may be said with reference to the computator, the motor, the variable escapement and form of mechanism for connecting the computing mechanism with the typewriter carriage considered as independent parts.

What I claim as new and desire to secure by Letters Patent is:

1. The combination in a computator of a set of registering rings arranged side to side in cylindrical form, each having an internal rack of teeth including one elongated tooth, a longitudinal shiftable shaft passing through the rings having projections adapted to engage with said elongated tooth, a longitudinal sliding key passing through the rings having bits progressively arranged adapted to engage with the racks of teeth respectively as the key is shifted longitudinally through the rings and means for rotating the key, and means for rotating the shaft, substantially as set forth.

2. The combination in a computator of a set of registering rings arranged side to side in cylindrical form, each having an internal rack of teeth, intermittent gearings connecting adjacent rings of the set, means for successively engaging the internal teeth of the several rings and rotating said rings, and means for disconnecting the intermittent gearing at each ring being rotated, substantially as set forth.

3. The combination in a computator of a set of registering rings arranged side to side in a cylindrical form, each ring having a wide-faced one-tooth gear and a gear having a complete circumference of teeth and a pair of connected intermittent gearing wheels engaging with the said gears of two adjacent registering rings and mounted on a shaft for longitudinal movement to disengage from the gear of the registering wheel having an entire circumference of teeth, substantially as set forth.

4. The combination in a computing mechanism of a case having a set of semi-circular bearings, a set of registering rings mounted in said bearings, spring bearing clips providing the other half of the bearing detachably engaging with the fixed casing bearing parts, substantially as set forth.

5. The combination in a computing device of a set of registering rings, shiftable intermittent gearings arranged to connect adjacent rings of the set, means for shifting the positions of said intermittent gearings consisting of a main sliding bar having a series of withdrawable trips, a supplemental sliding bar controlling the position of said trips and means on which the trips operate engaging with the intermittent gearings, substantially as set forth.

6. The combination in a computing device of a series of registering rings, intermittent gearings connecting adjacent rings of the set, means for successively shifting the intermittent gearings to disconnect and connect adjacent rings consisting of a sliding bar and a set of progressively arranged trips mounted on said bar, substantially as set forth.

7. In a computing machine, in combination, an operating key, an escapement mechanism including a series of stops, and mechanism controlled by said key for causing one of said stops to be withdrawn from operative position and another of said stops to be simultaneously projected into operative position when said key is depressed, and for causing said first-named stop to be returned to operative position and said last-named stop to be withdrawn when said key is released.

8. In a computing machine, in combination, an operating key, an escapement mechanism including a stationary member having a series of stops, and mechanism controlled by said key for causing one of said stops to be withdrawn from operative position and another of said stops to be simultaneously projected into operative position when said key is operated.

9. In a computing machine, in combination, an operating key, an escapement mechanism including a series of stops and one or more additional stops coöperating with the stops of said series, and mechanism controlled by said key for causing one of the stops of said series to be withdrawn from operative position and another of the stops of said series to be simultaneously projected into operative position when said key is operated.

10. The combination in an intermittent escapement for computing machines of a relatively movable part carrying a set of stops, a relatively stationary part having a second set of stops, devices for normally projecting one of said stops from each set into positions to engage one another, and means for at will withdrawing the normally projected stop of a set and projecting another stop of the same set, substantially as set forth.

11. The combination in an intermittent escapement for computing machines of a relatively movable part carrying a set of stops arranged in a circle, a relatively stationary part having a second set of stops arranged in a corresponding circle, devices for normally projecting one of said stops from each set into positions to engage one another, and means for at will withdrawing the normally projected stop of a set and projecting another stop of the same set, substantially as set forth.

12. The combination in an intermittent escapement for computing machines of a relatively rotatable part carrying a set of stops arranged in a circle, means for projecting the stops at a definite point as the stops are moved around the circle, means for withdrawing all the projected stops except one, a relatively stationary part having a second set of stops arranged in a corresponding circle, means for normally projecting one stop from said second set into a position to engage the projected stops of said first set, and means for at will withdrawing the normally projected stop of said second set and projecting another stop of the same set, substantially as set forth.

13. The combination in an intermittent escapement for computing machines of a case, a set of stops arranged in a circle, means for normally projecting one of said stops and at will projecting any of the other of said stops of the set, a rotatable disk carrying a second set of stops arranged in a circle, fixed means on the case for engaging with and projecting the stops of the latter set into a position to engage the projected stop of said first set as the disk is rotated, and means for normally withdrawing all of said stops of said latter set except one, substantially as set forth.

14. The combination in an intermittent escapement device for computing machines of a relatively movable part carrying a set of stops, means for projecting the stops from the movable part as the part is moved and withdrawing all of said projected stops except one of the set, a relatively stationary part having a second set of stops arranged in a corresponding position with those of the movable part, means for normally projecting one of said second set of stops and means for at will withdrawing the normally projected stop of said second set and projecting another stop of the same set, substantially as set forth.

15. The combination in an intermittent escapement for a computing machine of a relatively rotatable part carrying a set of stops arranged in a circle, means for projecting said stops as the part rotates and withdrawing all of the projected stops except one, a relatively non-rotatable part having a second set of stops arranged in a corresponding circle, means for normally projecting one of said stops of the second set simultaneously with the withdrawal of the projected stops of the first set and means for at will projecting and withdrawing any other stops of the second set, substantially as set forth.

16. The combination in an intermittent escapement for a computing machine, of a relatively rotatable part carrying a set of stops arranged in a circle, a relatively non-rotatable part having a second set of stops arranged in a corresponding circle, keys for at will independently controlling the position of all the stops of the second set except one, and means placing the control of said one stop of the second set and all of the stops of the first set except one under the control of all of said keys, substantially as set forth.

17. A computing attachment for typewriters comprising computator driving mechanism, a fixed support, a motor having a spring secured to said fixed support at one end and retractably connected with said computator driving mechanism at the other end, and means for detachably connecting the free end of the spring with a typewriter carriage, substantially as set forth.

18. The combination with a typewriter having a carriage, of a computing attachment including a series of indicators, a controller adapted when moved longitudinally to render said indicator successively operative, a movable stop mounted on said typewriter carriage for moving said controller longitudinally, and means for shifting said controller laterally into and out of engagement with said stop as it is moved longitudinally, substantially as set forth.

19. The combination with a typewriter having a carriage, of a computing attachment including a series of indicators, a controller adapted when moved longitudinally to render said indicator successively operative, a pair of movable stops mounted on said typewriter carriage for moving said controller longitudinally, and means for shifting said controller laterally into and out of engagement with said stops as it is moved longitudinally, substantially as set forth.

20. The combination with a typewriter having a carriage, of a computing attachment including a series of indicators, a controller adapted when moved longitudinally to render said indicators successively operative, a movable stop mounted on said typewriter carriage and having a series of steps in its operative face for moving said controller longitudinally, and means for shifting said controller laterally into and out of engagement with said steps successively as it is moved longitudinally, substantially as set forth.

21. The combination with computing mechanism including a series of indicators, of a controller adapted when moved longitudinally to render said indicators successively operative, a progressively movable stop for moving said controller longitudinally, and means for shifting said controller laterally into and out of engagement with said stop as it is moved longitudinally, substantially as set forth.

22. The combination with computing mechanism including a series of indicators, of a controller adapted when moved longitudinally to render said indicators successively operative, a pair of progressively movable stops for moving said controller longitudinally, and means for shifting said controller into and out of engagement with said stops as it is moved longitudinally, substantially as set forth.

23. The combination with computing mechanism including a series of indicators, of a controller adapted when moved longitudinally to render said indicators successively operative, a progressively movable stop having steps or series of shoulders for moving said controller longitudinally, and means for shifting said controller laterally into and out of engagement with said steps or shoulders successively as said controller is moved longitudinally, substantially as set forth.

24. The combination with computing mechanism including a series of indicators, of a controller having a cam groove and adapted when moved longitudinally to render said indicators successively operative, progressively movable shoulders or stops for moving said controller longitudinally, and a fixed pin engaging said cam groove for shifting said controller laterally into and out of engagement with said stops as it is moved longitudinally, one of said stops projecting above the highest point of movement of the active point of engagement on the controller and the other stop projecting below the lowest point of movement thereof, substantially as set forth.

25. The combination with a typewriter comprising keys and a carriage, of a computing attachment, a motor for operating the computing attachment, a variable escapement controlled by the keys and means controlled by the movement of the typewriter carriage for connecting up and disconnecting the variable escapement mechanism with the keys, substantially as set forth.

In witness whereof I have affixed my signature in the presence of two witnesses this 23rd day of July, 1909.

ESTHER A. BURNOP,
*Administratrix of William A. Burnop, deceased.*

Witnesses:
 WM. H. HODGKINSON,
 EMMA S. HESSE.

---

Copies of this patent may be obtained for five cents each, by addressing the "Commissioner of Patents, Washington, D. C."